(12) United States Patent
Ito et al.

(10) Patent No.: US 11,137,940 B2
(45) Date of Patent: Oct. 5, 2021

(54) STORAGE SYSTEM AND CONTROL METHOD THEREOF

(71) Applicant: Hitachi, Ltd., Tokyo (JP)

(72) Inventors: Shintaro Ito, Tokyo (JP); Yuko Matsui, Tokyo (JP); Masakuni Agetsuma, Tokyo (JP); Hideo Saito, Tokyo (JP); Takeru Chiba, Tokyo (JP); Takahiro Yamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 84 days.

(21) Appl. No.: 16/377,372

(22) Filed: Apr. 8, 2019

(65) Prior Publication Data

US 2019/0235792 A1 Aug. 1, 2019

Related U.S. Application Data

(63) Continuation of application No. 15/910,085, filed on Mar. 2, 2018, now Pat. No. 10,282,136.

(30) Foreign Application Priority Data

Nov. 30, 2017 (JP) .................................. 2017-231219

(51) Int. Cl.
*G06F 3/00* (2006.01)
*G06F 3/06* (2006.01)
*G06F 11/16* (2006.01)

(52) U.S. Cl.
CPC ............ *G06F 3/0659* (2013.01); *G06F 3/064* (2013.01); *G06F 3/067* (2013.01); *G06F 3/0619* (2013.01);

(Continued)

(58) Field of Classification Search
None
See application file for complete search history.

(56) References Cited

U.S. PATENT DOCUMENTS 6,446,175 B1 * 9/2002 West ................... G06F 11/1456
711/161
7,971,025 B2 * 6/2011 Murase ................. G06F 3/0607
711/173

(Continued)

FOREIGN PATENT DOCUMENTS

JP 2012-043407 A 3/2012

*Primary Examiner* — Craig S Goldschmidt
(74) *Attorney, Agent, or Firm* — Mattingly & Malur, PC

(57) ABSTRACT

A capacity control module which manages a physical storage area provided by each of storage devices in a cluster by dividing the physical storage area into a physical storage area having a predetermined size, in a plurality of storage nodes configuring a storage system, and, a storage control module which receives an I/O request from a higher-level device are provided, two storage control modules, which are arranged in different storage nodes and configure a redundancy configuration, are managed as a storage control module pair, the capacity control module preferentially allocates each of the physical storage areas in the vicinity of an arrangement destination of each of the storage control modules configuring the storage control module pair, to the storage control module pair, and storage data is read from or is written on the physical storage area, according to a command applied from the storage control module.

10 Claims, 35 Drawing Sheets

(52) U.S. Cl.
CPC .......... *G06F 3/0631* (2013.01); *G06F 3/0644* (2013.01); *G06F 3/0683* (2013.01); *G06F 11/16* (2013.01)

(56) References Cited

U.S. PATENT DOCUMENTS

| | | | |
|---|---|---|---|
| 8,335,899 B1 * | 12/2012 | Meiri | G06F 11/2076 711/162 |
| 8,984,243 B1 * | 3/2015 | Chen | G06F 3/0631 711/162 |
| 2003/0182312 A1 | 9/2003 | Chen et al. | |
| 2004/0117037 A1 * | 6/2004 | Hinshaw | G06F 16/273 700/2 |
| 2012/0047346 A1 | 2/2012 | Kawaguchi | |
| 2016/0041776 A1 | 2/2016 | Inoue | |

* cited by examiner

FIG. 7

| SCP NUMBER | ACTIVE SIDE ARRANGEMENT DESTINATION NODE NUMBER | PASSIVE SIDE ARRANGEMENT DESTINATION NODE NUMBER | LUN |
|---|---|---|---|
| 1 | 1 | 2 | 1,2 |
| 2 | 2 | 3 | 3,4 |
| 3 | 3 | 4 | 5 |
| 4 | 4 | 5 | 6 |
| ... | ... | ... | ... |

34A 34B 34C 34D

34

35

| PHYSICAL CHUNK NUMBER | AFFILIATION NODE NUMBER | DRIVE NUMBER | IN-DRIVE OFFSET |
|---|---|---|---|
| 0 | 0 | 0 | 0x00000 |
| 1 | 0 | 0 | 0x10000 |
| 2 | 0 | 0 | 0x20000 |
| 3 | 0 | 1 | 0x00000 |
| 4 | 1 | 0 | 0x00000 |
| 5 | 1 | 0 | 0x10000 |
| 6 | 2 | 1 | 0x00000 |
| 7 | 2 | 1 | 0x10000 |
| ... | ... | ... | ... |

| LOGIC CHUNK NUMBER | ALLOCATION DESTINATION SCP NUMBER | MASTER PHYSICAL CHUNK NUMBER | MIRROR PHYSICAL CHUNK NUMBER |
|---|---|---|---|
| 0 | 0 | 0 | 4 |
| 1 | 1 | 1 | 5 |
| 2 | 1 | 3 | 6 |
| ... | ... | ... | ... |

| NODE NUMBER | NUMBER OF FREE PHYSICAL CHUNKS |
|---|---|
| 0 | 0 |
| 1 | 10 |
| 2 | 3 |
| 3 | 7 |
| ... | ... |

| NODE NUMBER | NUMBER OF FREE PHYSICAL CHUNKS | NUMBER OF FREE PHYSICAL CHUNKS (SSD) | NUMBER OF FREE PHYSICAL CHUNKS (SAS) | NUMBER OF FREE PHYSICAL CHUNKS (SATA) |
|---|---|---|---|---|
| 0 | 0 | 0 | 0 | 0 |
| 1 | 10 | 5 | 2 | 3 |
| 2 | 3 | 0 | 2 | 1 |
| 3 | 7 | 7 | 0 | 0 |
| ... | ... | ... | ... | ... |

| LUN | VVOL ADDRESS | LOGIC CHUNK NUMBER | LOGIC CHUNK ADDRESS |
|---|---|---|---|
| 7 | XXX | 1 | AAA |
| 7 | YYY | 3 | BBB |
| 1 | ZZZ | 1 | CCC |
| ... | ... | ... | ... |

70A 70B 70C 70D

STORAGE SYSTEM AND CONTROL METHOD THEREOF

BACKGROUND OF THE INVENTION

1. Field of the Invention

The present invention relates to a storage system and a control method thereof, and for example, is preferably applied to an information processing system including a plurality of storage nodes in which each of one or a plurality of software defined storages (SDSs) are implemented. Furthermore, hereinafter, SDS indicates a storage device structured by implementing software having a storage function in a general-purpose server device.

2. Description of the Related Art

In the related art, in an information processing system, a technology of sharing capacity in a plurality of storage sub systems is proposed.

For example, there is a technology in which a first storage system including a first controller which receives an input and output command from a host and provides a first volume to the host, and a second storage system including a second controller which receives the input and output command from the host and provides a second volume to the host are provided, a first storage area in the first volume is allocated from a first pool by the first controller, a second storage area in the first volume is allocated from a second pool by the first controller, a third storage area in the second volume is allocated from the first pool by the second controller, and a fourth storage area in the second volume is allocated from the second pool by the second controller. Examples of the technology include a technology described in JP 2012-043407 A described below.

SUMMARY OF THE INVENTION

In the case of considering improvement in availability and reliability of the entire distributed storage system, it is desirable to perform redundancy with respect to the controller. In addition, it is also desirable to store data written on the storage system from the host by performing redundancy with respect to the data in the system, from the viewpoint of the availability and the reliability.

Here, when the controller and the data are subjected to redundancy, it is necessary to sufficiently consider where to arrange the redundancy data, from the viewpoint of response performance or data protection of the entire distributed storage system configured of a plurality of nodes.

The invention has been made in consideration of the circumstances described above, and an object of the invention is to propose a storage system, in which data protection can be performed while preventing deterioration in response performance of the entire system, and a control method thereof.

To solve such objects, in the present invention, a storage system includes: a plurality of storage nodes, wherein the storage node, includes a capacity control module which manages a physical storage area provided by each of storage devices in a cluster configured of a plurality of the storage nodes by dividing the physical storage area into a physical storage area having a predetermined size, and a storage control module which receives an I/O request from a higher-level device, generates a command according to the received I/O request, and transmits the command to the capacity control module, two storage control modules, which are arranged in the storage nodes different from each other and configure a redundancy configuration, are managed as a storage control module pair, one storage control module configuring the storage control module pair is set to be in a first state in which the I/O request from the higher-level device is received, and the other storage control module is set to be in a second state in which the I/O request is not received, and the capacity control module, respectively preferentially allocates the physical storage area in the vicinity of an arrangement destination of one storage control module configuring the storage control module pair, and the physical storage area in the vicinity of an arrangement destination of the other storage control module configuring the storage control module pair, to the storage control module pair, and writes data on each of the physical storage areas allocated to the storage control module pair to which the storage control module belongs, or reads data from one physical storage area which is set to a master in the physical storage areas, according to the command transmitted from the storage control module which is set to be in the first state on the basis of the I/O request from the higher-level device.

In addition, in the present invention, a control method of a storage system includes a plurality of storage nodes, in which the storage node includes a capacity control module which manages a physical storage area provided by each of storage devices in a cluster configured of the plurality of storage nodes by dividing the physical storage area into a physical storage area having a predetermined size, and a storage control module which receives an I/O request from a higher-level device, generates a command according to the received I/O request, and transmits the command to the capacity control module, two storage control modules, which are arranged in the storage nodes different from each other and configure a redundancy configuration, are managed as a storage control module pair, one storage control module configuring the storage control module pair is set to be in a first state in which the I/O request from the higher-level device is received, and the other storage control module is set to be in a second state in which the I/O request is not received, and the method includes: a first step of respectively preferentially allocating, in the capacity control module, the physical storage area in the vicinity of an arrangement destination of one storage control module configuring the storage control module pair, and the physical storage area in the vicinity of an arrangement destination of the other storage control module configuring the storage control module pair, to the storage control module pair; and a second step of writing, in the capacity control module, data on each of the physical storage areas allocated to the storage control module pair to which the storage control module belongs, or of reading, in the capacity control module, data from one physical storage area which is set to a master in the physical storage areas, according to the command transmitted from the storage control module which is set to be in the first state on the basis of the I/O request from the higher-level device.

According to a storage system and a capacity allocation method of the invention, at least two physical storage areas are allocated to a storage control module pair, and data is stored in these physical storage areas by being duplexed, and thus, the data is protected. In addition, a physical storage area in the vicinity of an arrangement destination of one storage control module configuring the storage control module pair, and a physical storage area in the vicinity of an arrangement destination of the other storage control module configuring the storage control module pair are preferentially allocated to the storage control module pair, and thus, a storage control module set to be in a first state or a storage control module, which is switched to be in the first state from a second state, is capable of promptly accessing the corresponding physical storage area in these physical storage areas, and reading/writing of the data with respect to the physical storage area is capable of being promptly performed.

According to the invention, a storage system, in which data protection can be performed while preventing deterioration in response performance of the entire system, and a control method thereof can be realized. Objects, configurations, and effects other than the above description will be clarified by the description of the following embodiments of the invention.

BRIEF DESCRIPTION OF THE DRAWINGS

FIG. 7 is a graphic chart illustrating a configuration of a storage control module pair management table;

FIG. 9 is a graphic chart illustrating a logic chunk management table;

FIG. 10 is a graphic chart illustrating a number of free physical chunks management table;

FIG. 26 is a graphic chart illustrating a configuration of a number of free physical chunks management table according to the third embodiment;

FIG. 36 is a graphic chart illustrating a configuration of a virtual volume management table.

DESCRIPTION OF THE PREFERRED EMBODIMENTS

Figure 1:
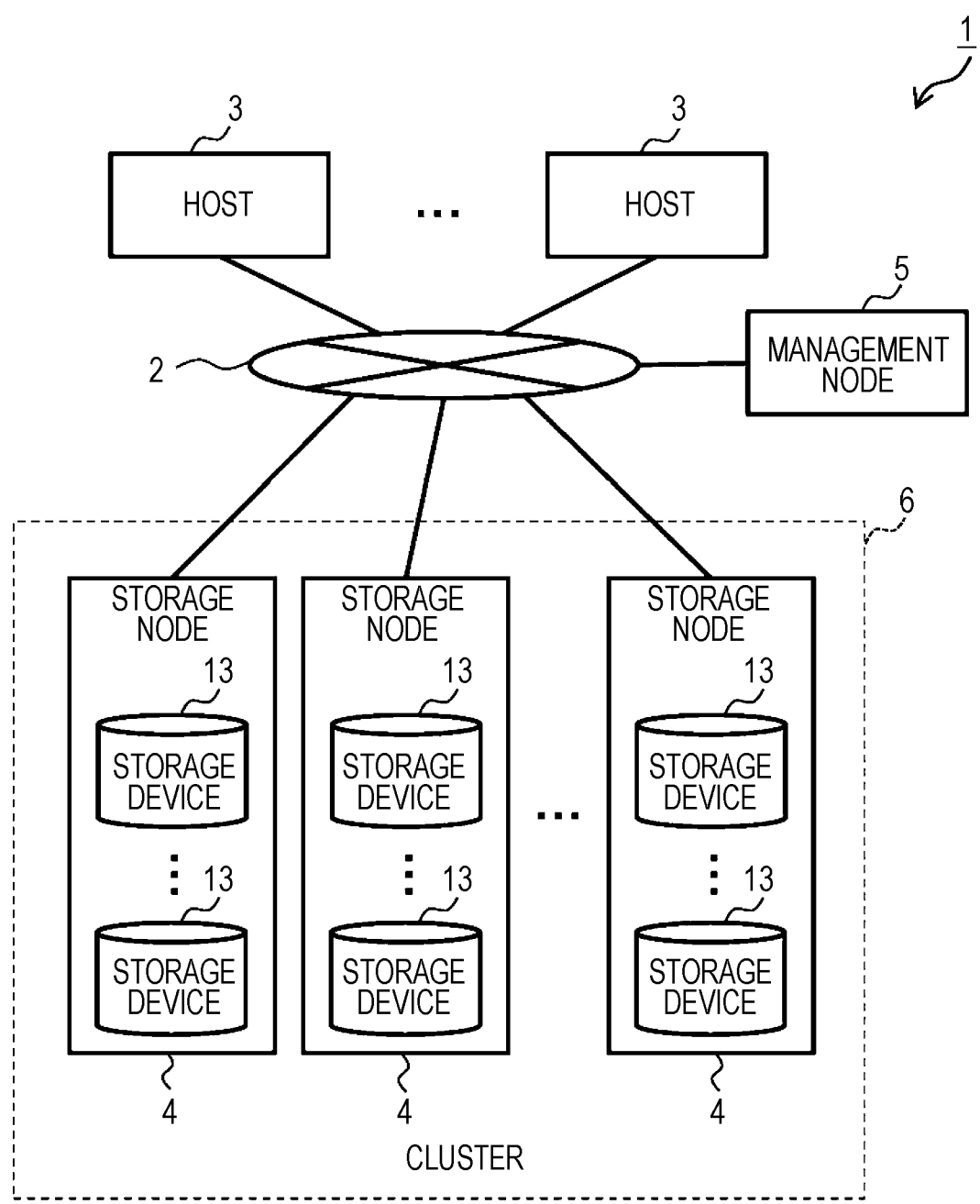
FIG. 1 is a block diagram illustrating an overall configuration of an information processing system according to a first embodiment.

Hereinafter, one embodiment of the invention will be described in detail, with reference to the drawings. The following description and drawings are exemplified in order to describe the invention, and are suitably omitted and simplified in order for clarification of the description. In addition, all combinations of the characteristics described in the embodiment are not limited to essential solutions of the invention. The invention is not limited to the embodiment, and any application example coincident with the thought of the invention is included in the technical range of the invention. In the invention, various additions or modifications can be performed by a person skilled in the art within the range of the invention. The invention can be performed in other various aspects. Unless otherwise particularly limited, each constituent may be a plurality of constituents or may be a single constituent.

In the following description, various information items are described in expressions such as "table", "chart", "list", and "queue", various information items may be expressed in other data structures. In order to indicate that it is not dependent on the data structure, "XX table", "XX list", and the like may be referred to as "XX information". Expressions such as "identification information", "identifier", "name", "ID", and "number" is used at the time of describing the contents of each information item, and the expressions can be substituted with each other.

In addition, in the following description, in a case where the same type of constituents are described without being discriminated, reference numerals or a common number of the reference numerals is used, and in a case where the same type of constituents are described by being discriminated, the reference numerals of the constituents can be used or IDs assigned to the constituents can be used instead of the reference numerals.

In addition, in the following description, there is a case where processing performed by executing a program is described, but the program is executed by at least one processor (for example, a CPU), and a subject of the processing may be a processor, in order to perform set processing while suitably using a storage resource (for example, a memory) and/or an interface device (for example, a communication port). Similarly, the subject of the processing performed by executing the program may be a controller, a device, a system, a calculator, a node, a storage system, a storage device, a server, a management calculator, a client, or a host, including a processor. The subject of the processing performed by executing the program (for example, the processor) may include a hardware circuit performing a part or all of the processing. For example, the subject of the processing performed by executing the program may include a hardware circuit executing encryption and decryption, or compression and extension. The processor is operated according to the program, and thus, is operated as a function module realizing a predetermined function. The device and the system, including the processor, are a device and a system, including such a function module.

The program may be installed in a device such as a calculator, from a program source. The program source, for example, may be a storage medium which can be read by a program distribution server or a calculator. In a case where the program source is the program distribution server, the program distribution server may include the processor (for example, the CPU) and the storage resource, and the storage resource may further store a distribution program and a program, which is a distribution target. Then, the processor of the program distribution server executes the distribution program, and thus, the processor of the program distribution server may distribute the program, which is the distribution target to the other calculator. In addition, in the following description, two or more programs may be realized as one program, or one program may be realized as two or more programs.

(1) First Embodiment (1-1)

Configuration of Information Processing System According to this Embodiment

FIG. 1 is a diagram illustrating a configuration of an information processing system 1 according to this embodiment. The information processing system 1, for example, includes a plurality of host devices 3 connected to each other through a network 2 configured of a fibre channel, the Ethernet (Registered Trademark), or a local area network (LAN), a plurality of storage nodes 4, and a management node 5.

The host device 3 is a general-purpose computer device transmitting a read request or a write request (hereinafter, suitably and collectively referred to as an input/output (I/O) request) to the storage node 4, according to a request from a user operation or an implemented application program. Furthermore, the host device 3 may be a virtual computer device such as a virtual machine.

Figure 2:
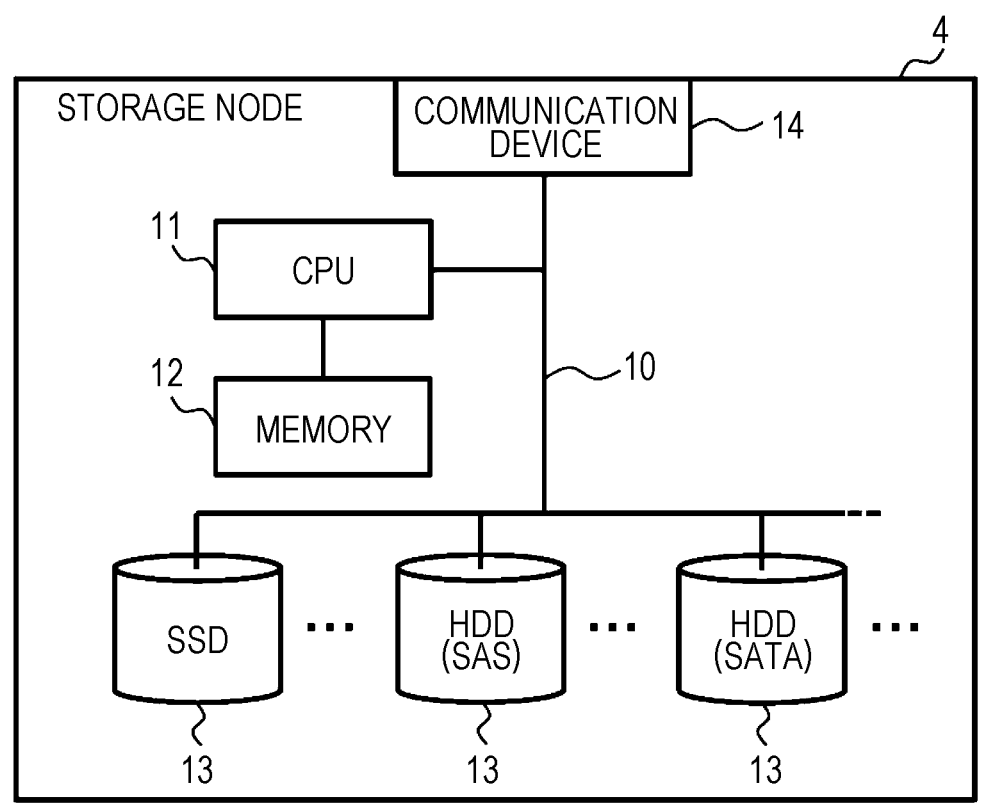
FIG. 2 is a block diagram illustrating a hardware configuration of a storage node.

The storage node 4 is a physical server device providing a storage area for reading and writing data with respect to the host device 3, and as illustrated in FIG. 2, includes a central processing unit (CPU) 11, a memory 12, a plurality of storage devices 13, and a communication device 14, which are connected to each other through an internal network 10. The storage nodes 4 include one or more CPUs 11, memories 12, storage devices 13, and communication devices 14, respectively.

The CPU 11 is a processor performing operation control with respect to the entire storage node 4. In addition, the memory 12 is configured of a volatile semiconductor memory such as a Static random access memory (RAM) (SRAM) or dynamic RAM (DRAM), and is used for temporarily retaining various programs or necessary data. The program stored in the memory 12 is executed by at least one CPU 11, and thus, various processing of the entire storage node 4 as described below are executed.

The storage device 13 is configured of one or a plurality of types of non-volatile storage devices having large capacity such as a solid state drive (SSD), a serial attached small computer system interface (SCSI) (SAS) hard disk drive, or a serial advanced technology attachment (ATA) (SATA) hard disk drive, and provides a physical storage area for reading/writing the data according to the write/read request (hereinafter, referred to as an input/output (I/O) request) from the host device 3 (FIG. 1).

The communication device 14 is an interface for performing communication with respect to the host device 3, the other storage node 4, or the management node 5 by the storage node 4 through the network 2 (FIG. 1), and for example, is configured of a network interface card (NIC), a fibre channel (FC) card, or the like. The communication device 14 performs protocol control at the time of performing communication with respect to the host device 3, the storage node 4, or the management node 5.

The management node 5 is a computer device used for managing the entire information processing system 1 by a system manager. The management node 5 manages the plurality of storage nodes 4 as a group referred to as a cluster 6. Furthermore, in FIG. 1, an example is illustrated in which only one cluster 6 is provided, but a plurality of clusters 6 may be provided in the information processing system 1. The cluster 6 may be referred to as a distributed storage system.

Figure 3:
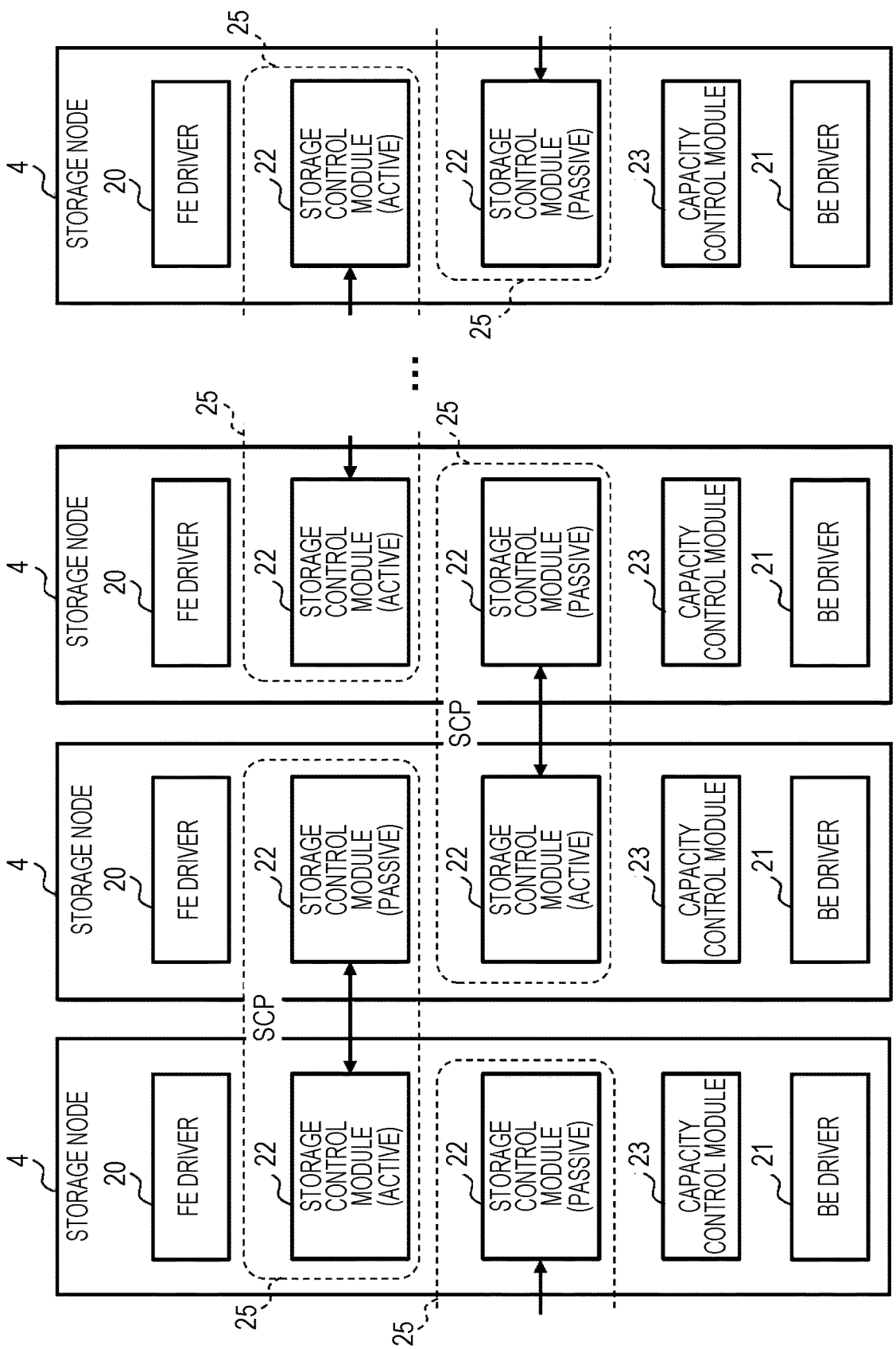
FIG. 3 is a block diagram illustrating a logic configuration of the storage node.

FIG. 3 illustrates a logic configuration of the storage node 4 according to this embodiment. As illustrated in FIG. 3, each of the storage nodes 4 includes a frontend driver 20 and a backend driver 21, one or a plurality of storage control modules 22, and a capacity control module 23.

The frontend driver 20 is software having a function of controlling the communication device 14 (FIG. 2), and of providing the interface, which is abstracted at the time of performing communication with respect to the host device 3, the other storage node 4, or the management node 5, with respect to the storage control module 22, to the CPU 11 (FIG. 2). In addition, the backend driver 21 is software having a function of controlling each of the storage devices 13 (FIG. 2) in the own storage node 4, and of providing the interface, which is abstracted at the time of performing communication with respect to the storage device 13, to the CPU 11.

The storage control module 22 is software functioning as a controller of a software defined storage (SDS). The storage control module 22 may be referred to as a storage control software or a storage control program. The storage control module 22 receives the I/O request from the host device 3, and issues the I/O command to the capacity control module 23 according to the I/O request.

In this embodiment, each of the storage control modules 22 implemented in the storage node 4 is managed as a pair configuring a redundancy configuration along with the other storage control modules 22 arranged in another storage node 4. Hereinafter, the pair will be referred to as a storage control module pair 25.

Furthermore, in FIG. 3, a case is illustrated in which one storage control module pair 25 is configured of two storage control modules 22, and hereinafter, it will be described that the storage control module pair 25 is configured of two storage control modules 22, but one redundancy configuration may be configured of three or more storage control modules 22.

In the storage control module pair 25, one storage control module 22 is set to be in a state where the I/O request from the host device 3 is capable of being received (a state of an active system, and hereinafter, referred to as an active mode), and the other storage control module 22 is set to be in a state where the read request or the write request from the host device 3 is not capable of being received (a state of a standby system, and hereinafter, referred to as a passive mode).

Then, in the storage control module pair 25, in a case where a failure occurs in the storage control module 22 set to be in the active mode (hereinafter, referred to as an active storage control module 22) or in the storage node 4 where the active storage control modules 22 are arranged, the state of the storage control module 22 which has been set to be in the passive mode (hereinafter, referred to as a passive storage control module 22) is switched to the active mode. Accordingly, in a case where the active storage control module 22 is not capable of being activated, the active storage control module 22 is capable of taking over I/O processing, which has been executed, by the passive storage control module 22.

The capacity control module 23 is software having a function of allocating the physical storage area provided by the storage device 13 in the own storage node 4 or in the other storage node 4, to each of the storage control module pairs 25, and of reading/writing the designated data with respect to the corresponding storage device 13, according to the I/O command applied from the storage control module 22. The capacity control module 23 may be referred to as a capacity control software or a capacity control program.

In such a case, the capacity control module 23 cooperates with the capacity control module 23 implemented in the other storage node 4 at the time of allocating the physical storage area provided by the storage device 13 in the other storage node 4 to the storage control module pair 25, and exchanges the data with respect to the capacity control module 23 through the network 2, and thus, performs reading/writing of the data with respect to the storage area according to the I/O command applied from the active storage control module 22 of the storage control module pair 25.

Figure 4:
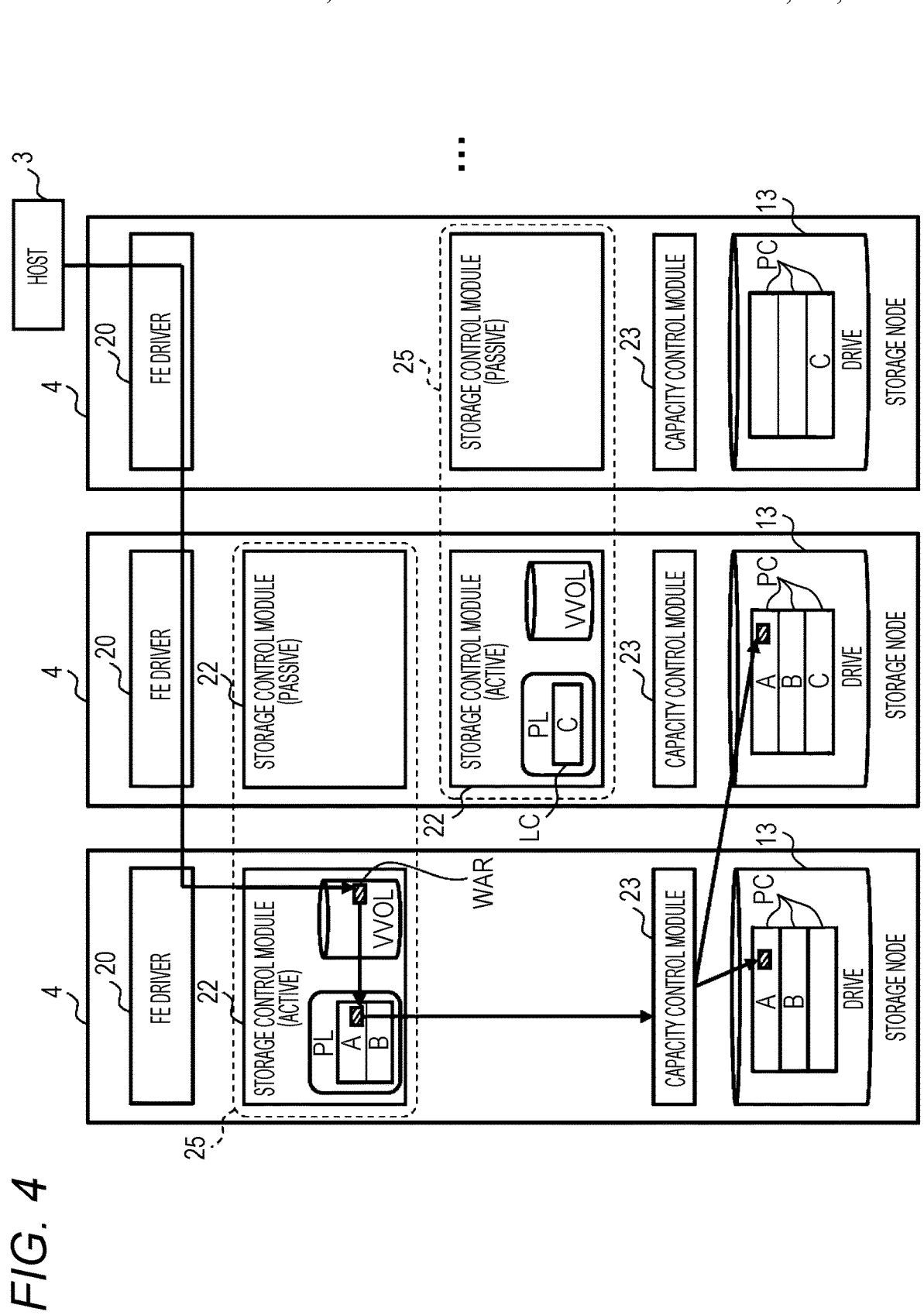
FIG. 4 is a block diagram illustrating a flow of write processing in this information processing system.

In this information processing system 1 having the configuration described above, the capacity control module 23, as illustrated in FIG. 4, manages the physical storage area provided by each of the storage devices 13 in each of the storage nodes 4 by dividing the physical storage area into each physical storage area (hereinafter, referred to as a physical chunk) PC having a predetermined size.

In addition, the capacity control module 23 associates each dedicated pool PL with each of the storage control module pairs 25 (FIG. 3), suitably allocates a logical storage area (hereinafter, referred to as a logic chunk) LC having the same size as that of the physical chunk PC to the pool PL, and associates one or a plurality of physical chunks PC with the logic chunk LC.

Further, one or a plurality of virtual logic volumes (hereinafter, referred to as a virtual volume) VVOL are defined on the pool PL of each of the storage control module pairs 25, and the virtual volume VVOL is provided to the host device 3.

Then, in a case where the host device 3 writes the data on such a virtual volume VVOL, the write request in which an identifier (logical unit number (LUN)) of a virtual volume (hereinafter, referred to as a write target virtual volume) VVOL of a write destination of the data, and an area (hereinafter, referred to as a write destination area) WAR of the write destination of the data in the write target virtual volume VVOL are designated, is transmitted to any storage node 4 in the corresponding cluster 6.

The frontend driver 20 of the storage node 4 receiving the write request transmits the write request to the frontend driver 20 of each of the storage nodes 4 in which the active storage control modules 22 (FIG. 3) or the passive storage control modules 22 of the storage control module pair 25 (FIG. 3) associated through the write target virtual volume VVOL and the pool PL which are designated in the received write request are arranged, and transmits the data of the write target (hereinafter, referred to as write data), which has been transmitted from the host device 3, along with the write request.

In addition, the frontend driver 20 of the storage node 4 receiving the write request and the write data, delivers the write request and the write data to the storage control modules 22 of the storage control module pair 25 associated through the write target virtual volume VVOL and the pool PL which are designated in the write request.

Then, in the storage control module 22, the active storage control module 22 to which the write request and the write data are delivered, allocates the storage area (hereinafter, referred to as a logic area) to the write destination area WAR in the write target virtual volume VVOL from the logic chunk LC configuring the pool PL associated with the write target virtual volume VVOL, as necessary.

In addition, such an active storage control module 22 generates the I/O command in which an address of the write destination area WAR in the write target virtual volume VVOL designated in the write request is converted into the chunk number of the logic chunk LC in which the logic area is allocated to the write destination area WAR, and an offset position of the logic area, and transmits the generate I/O command to the capacity control module 23 in the own storage node 4, along with the write data.

Then, in a case where the I/O command and the write data are received, the capacity control module 23 stores each data item in the storage area in such an offset position in each of the storage devices 13 providing each of the physical chunks PC associated with the logic chunks LC which are designated by the I/O command.

Thus, in this information processing system 1, the data from the host device 3 is subjected to redundancy and is stored in the plurality of physical chunks PC associated with the corresponding logic chunk LC. For this reason, the number of physical chunks PC to be allocated to the logic chunk LC is determined according to the set contents of a redundancy method in the information processing system 1.

For example, in the case of a setting in which the data is duplexed and stored, two physical chunks PC are associated with one logic chunk LC, and in the case of a setting in which the data is multiplexed according to triplexing or more, and is stored or in the case of a setting in which redundancy data from the data is prepared and is stored as with Erasure-Coding, the physical chunks PC the necessary number of greater than or equal to 3 are associated with one logic chunk LC.

Furthermore, in a case where the plurality of physical chunks PC are associated with one logic chunk LC, the data is multiplexed and is stored in the plurality of physical chunks PC, one physical chunk PC in the plurality of physical chunks PC is set to "master", and all of the remaining physical chunks PC are set to "mirror". Then, as described below, the data is read from the physical chunk PC, from the physical chunk PC set to "master". In addition, in the case of erasure coding (EC), the plurality of physical chunks PC are associated with one logic chunk LC, and the master data and the redundancy data are stored in the plurality of physical chunks PC in a predetermined pattern.

On the other hand, in a case where the data is read out from the virtual volume VVOL, the host device 3 transmits the read request in which LUN of the virtual volume (hereinafter, referred to as a read target virtual volume) VVOL and a storage area (hereinafter, referred to as a read destination area) of a read destination of the data in the read target virtual volume VVOL are designated, to any storage node 4 in the cluster 6 in which the read target virtual volume VVOL is included.

The frontend driver 20 of the storage node 4 receiving the read request, transmits each of the read request to each of the storage nodes 4 in which the active storage control modules 22 or the passive storage control modules 22 of the storage control module pair 25 associated through the read target virtual volume VVOL and the pool PL which are designated in the received read request, are arranged.

In addition, the frontend driver 20 of the storage node 4 receiving the read request, delivers the read request to the storage control modules 22 of the storage control module pair 25 associated through the read target virtual volume VVOL and the pool PL which are designated in the read request.

Thus, in such a storage control module 22 to which the read request is delivered, the active storage control module 22 generates the I/O command in which the address of the read destination area in the read target virtual volume VVOL is converted into the chunk number of the logic chunk LC in which the logic area is allocated to the read destination area and the offset position of the logic area, and transmits the generated I/O command to the capacity control module 23 in the own storage node 4.

In a case where the I/O command is received, the capacity control module 23 reads out the data from the storage area of the offset position designated by the I/O command in the physical chunk PC, which is set to "master", in each of the physical chunks PC associated with the logic chunk LC designated by the I/O command, and transmits the read-out data to the active storage control module 22 of a transmission source of the I/O command as read data. After that, the read data is transmitted to the host device 3 of the transmission source of such a read request by such an active storage control module 22 through the network 2.

(1-2) Allocation of Physical Chunk to Logic Chunk

However, as described above, in the case of adopting the redundancy method in which the data is subjected to redundancy by associating the plurality of physical chunks PC with one logic chunk LC, and by storing the data in each of the physical chunks PC, it is desirable that the plurality of physical chunks PC associated with one logic chunk LC are selected from the physical chunks PC provided by the storage nodes 4 different from each other, from the viewpoint of data protection. For example, this is because in a case where the plurality of physical chunks PC in the same storage node 4 are associated with one logic chunk LC, there is a concern that data lost occurs when the storage node 4 is not capable of reading out the data due to a failure or the like.

Therefore, in this information processing system 1, when the capacity control module 23 allocates the logic chunk LC to the storage control module pair 25, and associates the plurality of physical chunks PC with the logic chunk LC, the plurality of physical chunks PC are selected from the physical chunks PC provided by the plurality of storage nodes 4 different from each other.

On the other hand, in a case where the physical chunk PC associated with the logic chunk LC, is selected from the physical chunk PC in the storage node 4 different from the storage node 4 in which the active storage control modules 22 are arranged, communication with respect to the storage node 4 providing the physical chunk PC is required when the capacity control module 23 (the capacity control module 23 in the same storage node 4 as that of the active storage control module 22) receiving the I/O command from the active storage control module 22 performs reading/writing of the data with respect to the physical chunk PC, and thus, response performance of the entire system may be degraded. Accordingly, when the plurality of physical chunks PC are associated with the logic chunk LC, it is desirable that one of the physical chunks PC is selected from the physical chunk PC provided by the storage device 13 in the storage node 4 where the active storage control modules 22 are arranged, from the viewpoint of the response performance of the entire system.

In addition, in a case where a failure occurs in the storage node 4 where the active storage control modules 22 of the storage control module pair 25 are arranged, in consideration of the switching of the passive storage control module 22 to be in the active mode, according to the same reason as described above, it is desirable that one of the physical chunks PC associated with the logic chunk LC is selected from the physical chunk PC from the storage device 13 in the storage node 4 where the passive storage control modules 22 are arranged, from the viewpoint of the response performance of the entire system.

Therefore, in this information processing system 1, when the capacity control module 23 allocates the logic chunk LC to the storage control module pair 25, and associates the plurality of physical chunks PC with the logic chunk LC, a capacity preferential allocation function in which the physical chunk PC provided by the storage device 13 in the storage node 4 where the active storage control modules 22 of the storage control module pair 25 are arranged, and the physical chunk PC provided by the storage device 13 in the storage node 4 where the passive storage control modules 22 of the storage control module pair 25 are arranged are preferentially associated with the logic chunk LC, is provided in the capacity control module 23.

Here, in a case where the physical chunk PC is unlimitedly associated with the logic chunk LC in the pool PL allocated to one storage control module pair 25, from the storage node 4 where the active storage control modules 22 or the passive storage control modules 22 configuring the storage control module pair 25 are arranged, the physical chunk PC may not be associated with the logic chunk LC of the other storage control module pair 25 where the active storage control modules 22 or the passive storage control modules 22 are arranged in the storage node 4, from the storage device 13 in the storage node 4.

Therefore, such a capacity preferential allocation function includes a function of suppressing the capacity of the physical chunk PC which is allocated to the storage control module pair 25 from the storage node 4 where the active storage control modules 22 of the storage control module pair 25 are arranged or the storage node 4 where the passive storage control modules 22 of the storage control module pair 25 are arranged.

Figure 5:
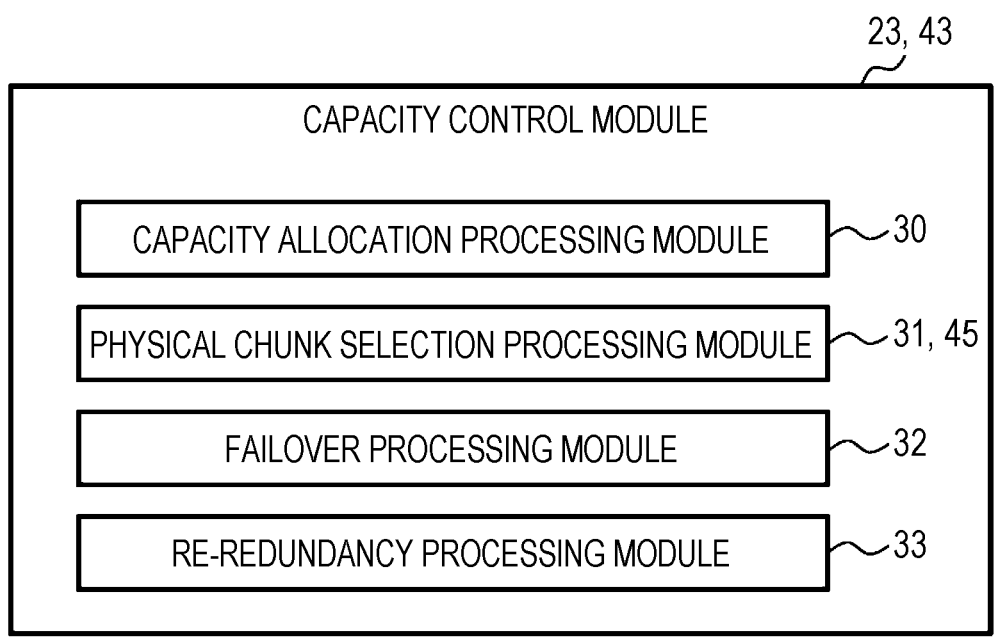
FIG. 5 is a block diagram illustrating a detailed configuration of a capacity control module.
Figure 6:
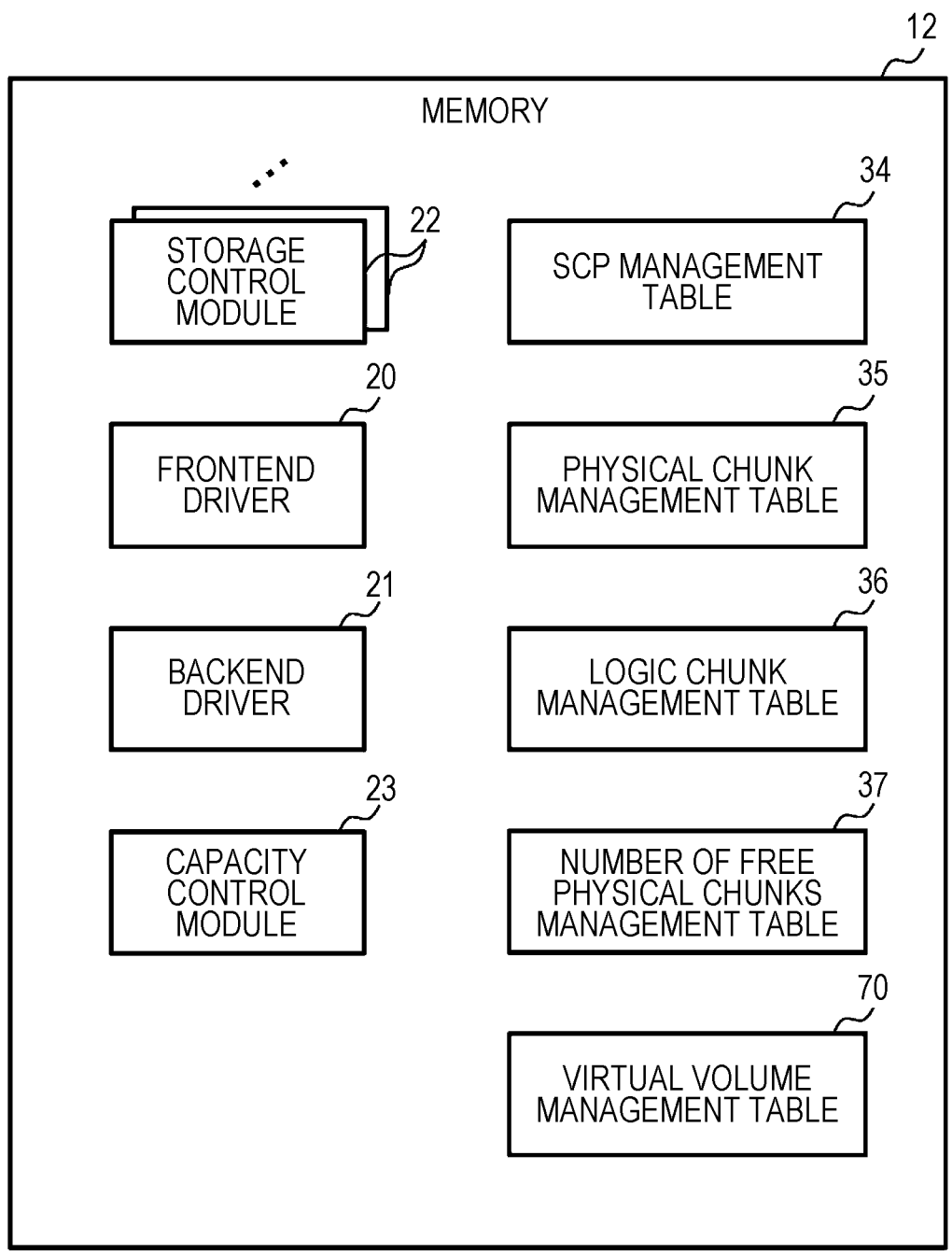
FIG. 6 is a block diagram illustrating a memory configuration of the storage node.

As means for realizing such a capacity preferential allocation function, the capacity control module 23, as illustrated in FIG. 5, includes a capacity allocation processing module 30, a physical chunk selection processing module 31, a failover processing module 32, and a re-redundancy processing module 33. In addition, as illustrated in FIG. 6, a storage control module pair management table 34, a physical chunk management table 35, a logic chunk management table 36, a number of free physical chunks management table 37, and a virtual volume management table 70 are stored in the memory 12 of each of the storage nodes 4, in addition to the frontend driver 20, the backend driver 21, one or a plurality of storage control modules 22, and the capacity control module 23, described above.

The capacity allocation processing module 30 is a program having a function of associating the physical chunk PC with the logic chunk LC allocated to the storage control module pair 25. In addition, the physical chunk selection processing module 31, for example, is a program having a function of being called out while the capacity allocation processing module 30 associates the physical chunk PC with the logic chunk LC, and of selecting the physical chunk PC associated with the logic chunk LC.

In addition, the failover processing module 32 is a program having a function of taking over the I/O processing executed by the active storage control module 22 of the storage control module pair 25 to the passive storage control module 22 of the storage control module pair 25, in a case where each of the storage nodes 4 in which the active storage control modules 22 are arranged, is monitored with respect to each of the storage control module pairs 25, and a failure occurs in the storage node 4.

On practice, in the case of detecting the failure of the storage node 4 in which the active storage control modules 22 of the storage control module pair 25 are arranged, the failover processing module 32 switches the state of the passive storage control module 22 of the storage control module pair 25 to the active mode, and thus, takes over the I/O processing executed by the active storage control module 22 of the storage control module pair 25 to the passive storage control module 22 of the storage control module pair 25.

Further, the re-redundancy processing module 33 is a program having a function of associating the physical chunk PC provided by the other storage node 4 instead of the physical chunk PC provided by the storage node 4, with the logic chunk LC, in a case where each of the storage nodes 4 providing each of the physical chunks PC associated with the logic chunk LC which is allocated to the storage control module pair 25, is monitored with respect to each of the storage control module pairs 25, and a failure occurs in any storage node 4. According to the processing of the re-redundancy processing module 33, a storage destination of the data written on such a logic chunk LC is subjected to re-redundancy.

On the other hand, the storage control module pair management table 34 is a table to be used for managing the configuration of each of the storage control module pairs 25 by the capacity control module 23, and as illustrated in FIG. 7, includes a storage control module pair number section 34A, an active side arrangement destination node number section 34B, a passive side arrangement destination node number section 34C, and a LUN section 34D. In the storage control module pair management table 34, one row corresponds to one storage control module pair 25.

Then, all unique numbers (pair numbers) of the storage control module pair 25, which are applied to each of the storage control module pairs 25 defined in the corresponding cluster 6, are stored in the storage control module pair number section 34A.

In addition, all unique numbers (node numbers) of the storage node 4, which are applied to the storage node 4 in which the active storage control modules 22 of the corresponding storage control module pair 25 are arranged, are stored in the active side arrangement destination node number section 34B, and the node number of the storage node 4 in which the passive storage control modules 22 of the storage control module pair 25 are arranged is stored in the passive side arrangement destination node number section 34C.

Further, an LUN, which is an identification information identifying a virtual volume to be provided to the host 3, is stored in the LUN section 34D, and is managed by being associated with a storage control module pair number, an active side arrangement destination node number, and a passive side arrangement destination node number, which manage the virtual volume identified by the LUN.

When the I/O request (the read request or the write request) is received from the host 3, the frontend driver 20 of each of the storage nodes 4 acquires the LUN included in the I/O request, and specifies the storage control module pair number, the active side arrangement destination node number, and the passive side arrangement destination node number, which are associated with the LUN, by using the storage control module pair management table 34. Accordingly, the frontend driver 20 of each of the storage nodes 4 is capable of specifying a storage control module pair managing the virtual volume, which is an I/O request destination, and an arrangement destination node of the storage control module pair.

Accordingly, in the case of the example of FIG. 7, the storage control module pair 25 to which the pair number of "1" is applied, illustrates that the active storage control modules 22 are arranged in the storage node 4 to which the node number of "1" is applied, and the passive storage control modules 22 are arranged in the storage node 4 to which the node number of "2" is applied.

Figure 8:
FIG. 8 is a graphic chart illustrating a physical chunk management table.

The physical chunk management table 35 is a table to be used for managing the physical chunk PC defined in the cluster 6 by the capacity control module 23, and as illustrated in FIG. 8, includes a physical chunk number section 35A, an affiliation node number section 35B, a drive number section 35C, and an in-drive offset section 35D. In the physical chunk management table 35, one row corresponds to one physical chunk PC.

Then, all unique numbers (physical chunk numbers) of the physical chunk PC, which are applied to each of the physical chunks PC in the cluster 6, are stored in the physical chunk number section 35A, and the node number of the storage node 4 providing the corresponding physical chunk PC is stored in the affiliation node number section 35B.

In addition, a unique number (a drive number) of the storage device 13, which is applied to the storage device 13 providing the physical chunk PC in the storage node 4 providing the corresponding physical chunk PC, is stored in the drive number section 35C. Further, the offset position from the head of the storage area of the physical chunk PC in the storage area provided by the storage device 13 is stored in the in-drive offset section 35D.

Accordingly, in the case of the example of FIG. 8, it is illustrated that the physical chunk PC of which the physical chunk number is "0" is an storage area having a predetermined size, which starts from a position offset by "0x00000" from the head of the storage device 13 of which the drive number is "0" provided in the storage node 4 of which the storage number is "0".

The logic chunk management table 36 is a table to be used for managing the logic chunk LC defined in the cluster 6 by the capacity control module 23, and as illustrated in FIG. 9, includes a logic chunk number section 36A, an allocation destination storage control module pair number section 36B, a master physical chunk number section 36C, and a mirror physical chunk number section 36D. In the logic chunk management table 36, one row corresponds to one logic chunk LC.

Then, an unique number (a logic chunk number) of the logic chunk LC, which is applied to each of the logic chunks LC in the cluster 6, is stored in the logic chunk number section 36A, and the pair number of the storage control module pair 25 to which the corresponding logic chunk LC is allocated is stored in the allocation destination storage control module pair number section 36B.

In addition, in the plurality of physical chunks PC associated with the corresponding logic chunk LC, the physical chunk number of the physical chunk PC set to "master" is stored in the master physical chunk number section 36C, and in such a plurality of physical chunks PC, the physical chunk number of the physical chunk PC set to "mirror" is stored in the mirror physical chunk number section 36D.

Accordingly, in the case of the example of FIG. 9, it is illustrated that the logic chunk LC of which the logic chunk number is "0" is allocated to the storage control module pair 25 of which the pair number is "0", and the physical chunk PC set to "master", of which the chunk number is "0", and the physical chunk PC set to "mirror", of which the chunk number is "4", are associated with the logic chunk LC.

FIG. 36 illustrates the configuration of the virtual volume management table 70. The virtual volume management table 70 is a table to be used for managing a corresponding relationship between an area of each virtual volume and a logic chunk associated with the area, and as illustrated in FIG. 36, includes a LUN section 70A, a VVOL address section 70B, a logic chunk number section 70C, and a logic chunk address section 70D.

The LUN, which is identification information identifying the virtual volume to be provided to the host 3, and an address of the virtual volume (a VVOL address) are respectively stored in the LUN section 70A and the VVOL address section 70B, and the logic chunk number of the logic chunk allocated to the area of the virtual volume to be identified by the LUN and the VVOL address and an address of the logic chunk (a logic chunk address) are respectively stored in the logic chunk number section 70C and the logic chunk address section 70D. The information of the LUN section 70A, the VVOL address section 70B, the logic chunk number section 70C, and the logic chunk address section 70D is managed by being associated with each of the areas of the virtual volume.

For example, a range of the address indicating the area of the virtual volume may be stored in the VVOL address section 70B, or a head address of the area of the virtual volume may be stored. Similarly, for example, a range of the address indicating the area of the logic chunk may be stored in the logic chunk address section 70D, or a head address of the area of the logic chunk may be stored.

When the I/O request (the read request or the write request) is received, the storage control module 22 of each of the storage nodes 4 acquires the LUN and the VVOL address included in the I/O request, and specifies the logic chunk number and the logic chunk address associated with the LUN and the VVOL address by using the virtual volume management table 70. Accordingly, the storage control module 22 of each of the storage nodes 4 is capable of specifying the area of the logic chunk allocated to the area of the virtual volume, which is the I/O request destination.

In the virtual volume management table 70, for example, the virtual volume management table 70 relevant to all virtual volumes provided by the cluster (the distributed storage system) 6 may be shared in each node, and for example, the virtual volume management table 70 relevant to the virtual volume provided by the storage control module pair 25 may be managed with respect to each of the storage control module pairs 25.

The number of free physical chunks management table 37 is a table to be used for managing the total number of unused physical chunks PC (hereinafter, referred to as free physical chunks PC) which are not yet associated with any logic chunk LC in each of the storage nodes 4 by the capacity control module 23, and as illustrated in FIG. 10, includes a node number section 37A and a number of free physical chunks section 37B. In the number of free physical chunks management table 37, one row corresponds to one storage node 4.

Then, the node numbers of all of the storage nodes 4 in the cluster 6 are respectively stored in the node number section 37A, and the total number of free physical chunks in the corresponding storage node 4 is stored in the number of free physical chunks section 37B.

Accordingly, in the case of the example of FIG. 10, it is illustrated that no free physical chunk PC exists in the storage node 4 of which the node number is "0" (the number of free physical chunks is "0"), and "10" free physical chunks PC exist in the storage node 4 of which the node number is "1".

(1-3) Various Processing Executed in Storage Node (1-3-1) Write Processing

Figure 11:
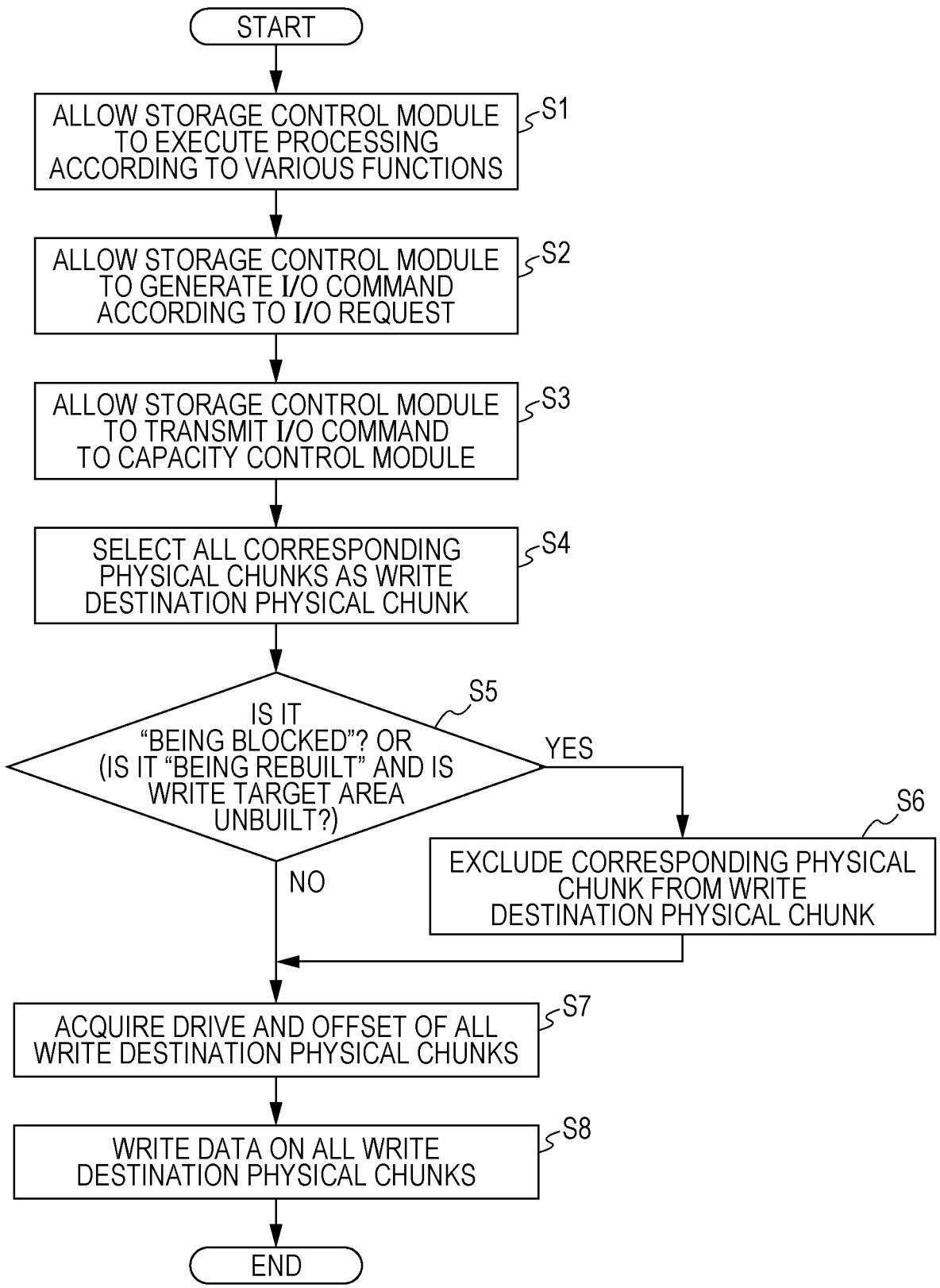
FIG. 11 is a flowchart illustrating a processing procedure of the write processing.

FIG. 11 illustrates the flow of the write processing executed in a case where the active storage control module 22 of the storage control module pair 25 receives write request, in which the virtual volume VVOL associated with the storage control module pair 25 is set to the write target.

In a case where the active storage control module 22 receives such a write request, the write processing illustrated in FIG. 11 is started, and first, the active storage control module 22 receiving the write request executes necessary processing relevant to a necessary function such as a capacity virtualizing function, a local copy function, and a remote copy function (S1).

After that, the active storage control module 22 generates the I/O command in which the address of the write destination area designated in the write request in the virtual volume (the write target virtual volume) VVOL of the write target is converted into the chunk number of the corresponding logic chunk LC and offset position of the corresponding logic area in the logic chunk LC (S2), and transmits the generated I/O command to the capacity control module 23 in the own storage node 4 (S3). Furthermore, hereinafter, the logic area is allocated in advance to the write destination area of the write target virtual volume VVOL designated in such a write request from the logic chunk LC.

The capacity control module 23 receiving the I/O command selects all of the physical chunks PC associated with the logic chunk LC in which the logic area is allocated to the write destination area of the write target virtual volume VVOL designated in the write request from the host device 3, as a write destination physical chunk PC (S4).

Subsequently, the capacity control module 23 determines whether any selected write destination physical chunk PC is in a state of being blocked due to the failure of the storage device 13 (hereinafter, referred to as "being blocked"), or in a state where data copy with respect to the storage area is not yet completed in the storage device 13 corresponding to the read destination area designated in such a write request, in which the data is copied (hereinafter, referred to as "being rebuilt") (S5).

Then, in a case where a negative result is obtained in the determination, the capacity control module 23 proceeds to Step S7. In contrast, in a case where a positive result is obtained in the determination of Step S5, the write destination physical chunk PC is in the state of "being blocked" or "being rebuilt", and the capacity control module 23 excludes physical chunk PC in which the data copy with respect to the storage area corresponding to the write destination area is not yet completed, from the write destination physical chunk PC (S6), and after that, proceeds to Step S7.

In addition, in a case where the capacity control module 23 proceeds to Step S7, the drive number of the storage device 13 providing each of the write destination physical chunks PC to all of the write destination physical chunks PC, and the offset position of the write destination physical chunk PC in the storage device 13 are acquired with reference to the physical chunk management table 35 (FIG. 8) (S7).

Then, the capacity control module 23 stores the write data, which is received by the active storage control module 22 along with the write request, in each of the corresponding storage areas in all of the write destination physical chunks PC, on the basis of the acquired information (S8). As described above, the write processing is ended.

(1-3-2) Read Processing

Figure 12:
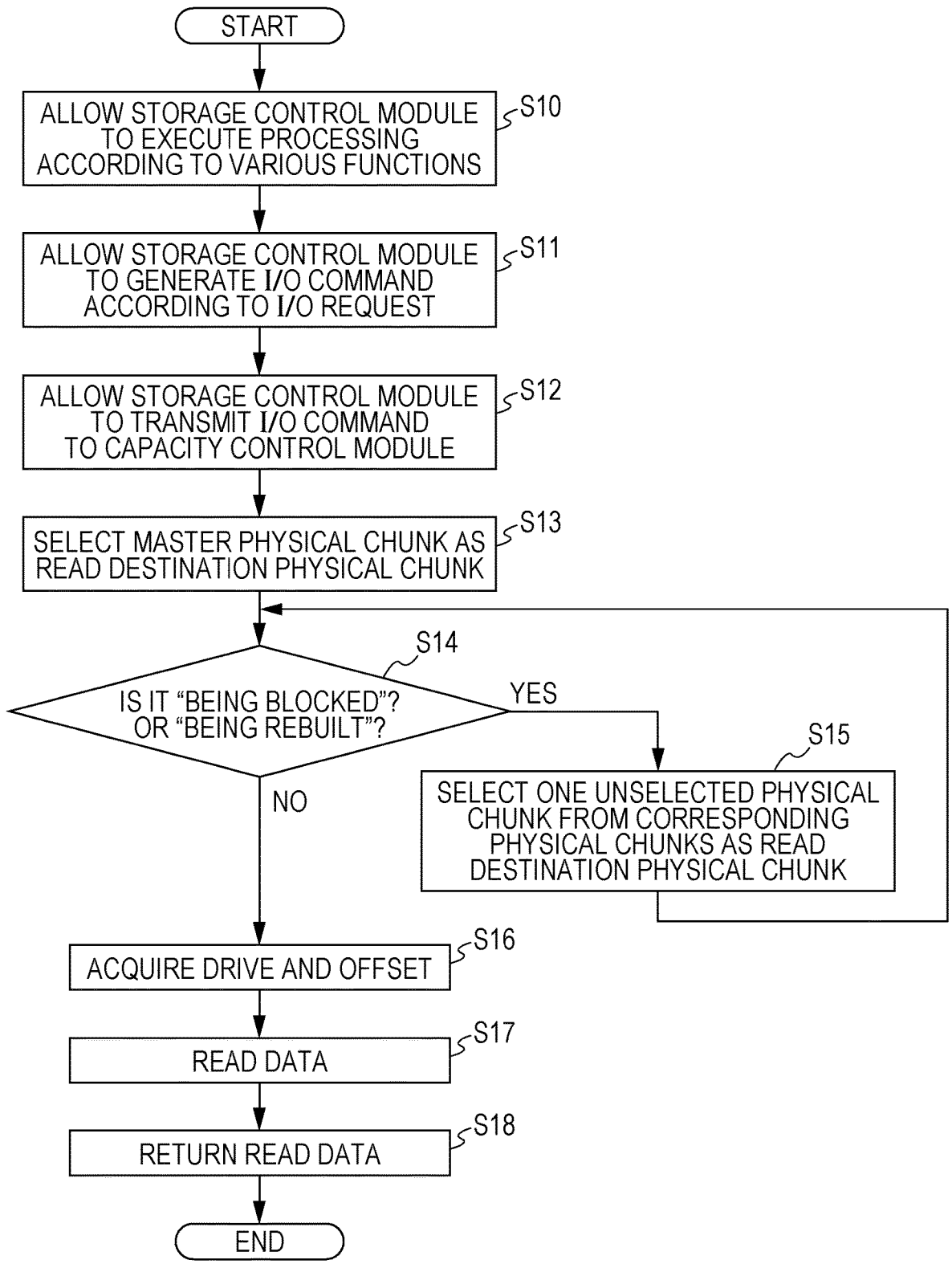
FIG. 12 is a flowchart illustrating a processing procedure of read processing.

On the other hand, FIG. 12 illustrates the flow of the processing to be executed in a case where the active storage control module 22 of the storage control module pair 25 receives the read request in which the virtual volume VVOL associated with the storage control module pair 25 is set to the read target.

In a case where the active storage control module 22 receives such a read request, the read processing illustrated in FIG. 12 is started, and first, the active storage control module 22 receiving the read request executes necessary processing relevant to a necessary function such as a capacity virtualizing function, a local copy function, and a remote copy function (S10).

After that, the active storage control module 22 generates the I/O command in which the address of the read destination area designated in the read request in the virtual volume (the read target virtual volume) VVOL of the read target is converted into the chunk number of the corresponding logic chunk LC and the offset position of the corresponding logic area in the logic chunk LC (S11), and transmits the generated I/O command to the capacity control module 23 in the own storage node 4 (S12).

The capacity control module 23 receiving the I/O command selects the physical chunk PC set to "master" in all of the physical chunks PC associated with the logic chunk LC in which the logic area is allocated to the read destination area designated in the read request of the read target virtual volume VVOL designated in the read request from the host device 3, as a read destination physical chunk PC (S13).

Subsequently, the capacity control module 23 determines whether the selected read destination physical chunk PC is in the state of "being blocked" or "being rebuilt" (S14). Then, in a case where a positive result is obtained in the determination, the capacity control module 23 selects the physical chunk PC in which the determination of Step S14 is not yet performed, in the physical chunks PC associated with the logic chunk LC in which the logic area is allocated to the read destination area of the read target virtual volume VVOL designated in the read request, as a new read destination physical chunk PC (S15). In addition, the capacity control module 23 returns to Step S14, and then, repeats a loop of Step S14 to Step S15 to Step S14 until a negative result is obtained in Step S14.

Then, in a case where a negative result is obtained in Step S14 by detecting the physical chunk PC coincident with the condition, the capacity control module 23 acquires the drive number of the storage device 13 providing the read destination physical chunk PC and the offset position of the read destination physical chunk PC in the storage device 13 from the physical chunk management table 35 (FIG. 8) (S16).

In addition, the capacity control module 23 reads out the data designated in the read request from the host device 3, from the storage device 13, on the basis of the acquired information (S17), and returns the read-out read data to the active storage control module 22 of the transmission source of such an I/O command (S18), and then, ends the read processing. Furthermore, the active storage control module 22 receiving the read data transmits the read data to the host device 3 of the transmission source of the read request.

Furthermore, the data of the data target is distributed and is stored in the plurality of physical chunks PC by erasure coding (EC), along with the redundancy data, and in Step S13 described above, the capacity control module 23 selects all of the plurality of physical chunks PC as the read destination physical chunk PC.

In addition, in Step S14, the capacity control module 23 determines whether at least one of the selected read destination physical chunks PC is in the state of "being blocked" or "being rebuilt". Then, in a case where a negative result is obtained in the determination, the capacity control module 23 reads out the data from each of the read destination physical chunks PC by executing Step S16 and Step S17 with respect to each of the read destination physical chunks PC as described above. In addition, the capacity control module 23 generates original data on the basis of the read-out data, and then, in Step S18, returns the generated data to the active storage control module 22 of the transmission source of such an I/O command, as the read data, and after that, ends the read processing.

In contrast, in a case where a positive result is obtained in Step S14, the capacity control module 23 reads out the data from each of the read destination physical chunks PC by executing Step S16 and Step S17 with respect to the remaining read destination physical chunk PC, which is not in the state of "being blocked" or "being rebuilt", as described above. In addition, the capacity control module 23 decompresses the data stored in the read destination physical chunk PC in the state of "being blocked" or "being rebuilt", on the basis of the read-out data, and generates the original data by using the decompressed data, and then, in Step S18, returns the generated data to the active storage control module 22 of the transmission source of such as an I/O command, as the read data, and after that, ends the read processing.

(1-3-3) Capacity Allocation Processing

Figure 13:
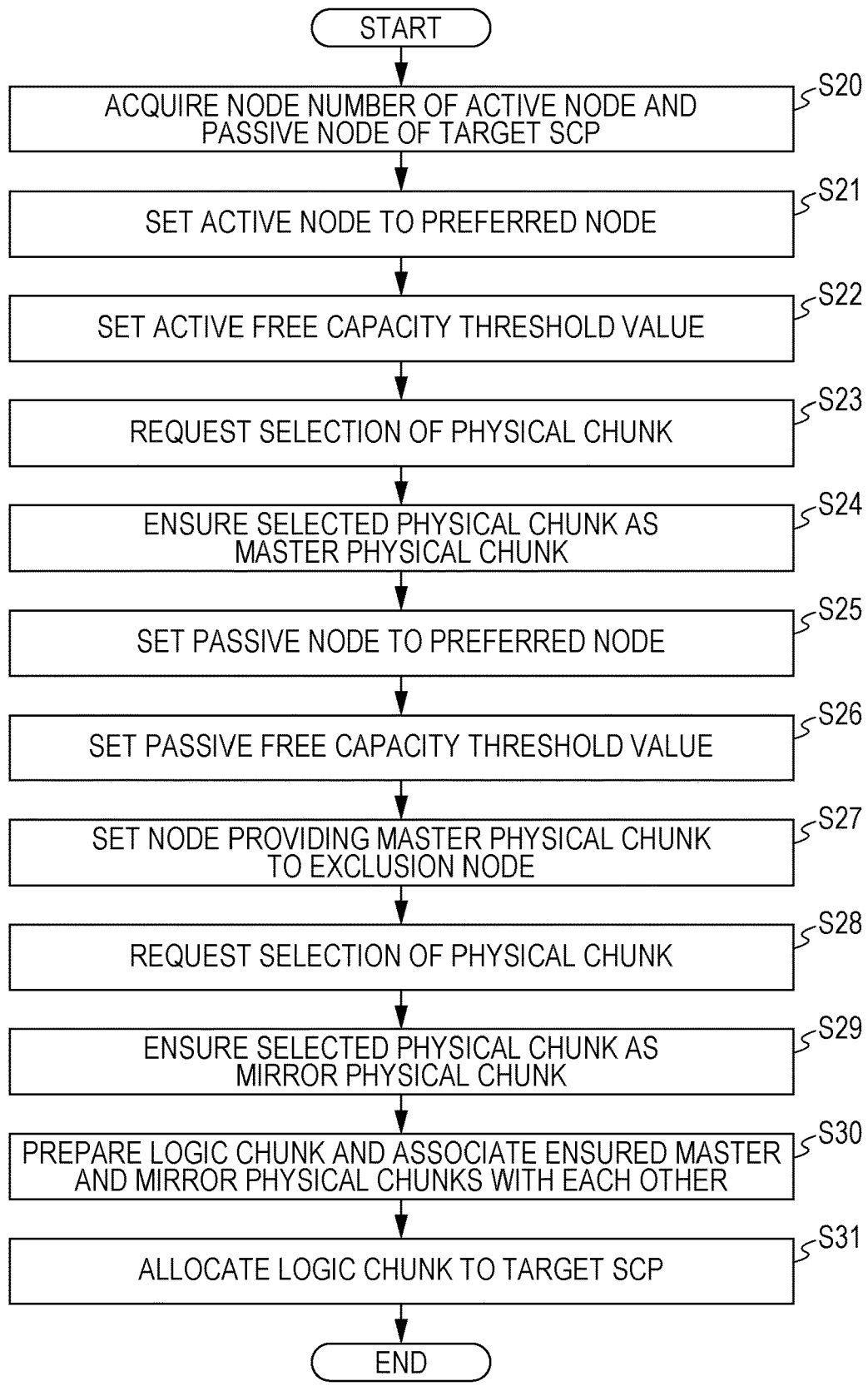
FIG. 13 is a flowchart illustrating a processing procedure of capacity allocation processing.

On the other hand, FIG. 13 illustrates a processing procedure of capacity allocation processing executed by the capacity allocation processing module 30 (FIG. 5) of the capacity control module 23 in which the allocation of the initial or the additional storage capacity (physical chunk PC) with respect to the storage control module pair 25 to which the active storage control module 22 belongs, is requested from the active storage control module 22 in the same storage node 4.

In a case where such a request is applied, the capacity allocation processing module 30 starts the capacity allocation processing illustrated in FIG. 13, and first, acquires all of the node numbers of the storage nodes 4 in which each of the storage control modules 22 configuring the storage control module pair 25 (hereinafter, referred to as a target storage control module pair 25) to which the storage capacity is allocated, are arranged, with reference to the storage control module pair management table 34 (FIG. 7) (S20).

Subsequently, the capacity allocation processing module 30 sets the storage node 4 in which the active storage control modules 22 of the target storage control module pair 25 are arranged, to a preferred node (S21). In addition, the capacity allocation processing module 30 sets a lower limit value of the total capacity of the free physical chunk in the storage node 4 where the active storage control modules 22 of the target storage control module pair 25 are arranged, as an active free capacity threshold value (S22). Furthermore, the active free capacity threshold value may be set by the system manager or the like at the time of providing this information processing system 1, or may be designated in advance as a constant on a program.

Next, the capacity allocation processing module 30 calls out the physical chunk selection processing module 31 (FIG. 5), and requests the selection of the physical chunk PC to be associated with the logic chunk LC allocated to the target storage control module pair 25 (S23). Thus, the physical chunk selection processing module 31 receiving the request preferentially selects the physical chunk PC to be allocated to the logic chunk LC of the target storage control module pair 25 in the free physical chunks PC in the cluster 6, from the free physical chunk PC in the preferred node (here, the storage node 4 in which the active storage control modules 22 are arranged), and notifies the chunk number of the selected free physical chunk PC to the capacity allocation processing module 30.

Then, in a case where the chunk number of such a free physical chunk PC is notified from the physical chunk selection processing module 31, the capacity allocation processing module 30 ensures the physical chunk PC of the chunk number as the physical chunk PC of "master" (S24).

Next, the capacity allocation processing module 30 sets the storage node 4 in which the passive storage control modules 22 of the target storage control module pair 25 are arranged, to the preferred node (S25). In addition capacity allocation processing module 30 sets a lower limit value of the total capacity of the free physical chunk PC in the storage node 4 where the passive storage control modules 22 of the target storage control module pair 25 are arranged, as a passive free capacity threshold value (S26). Furthermore, the passive free capacity threshold value may be set by the system manager or the like at the time of providing this information processing system 1, or may be designated in advance as a constant on a program.

Further, the capacity allocation processing module 30 sets the storage node 4 providing the physical chunk PC set to "master", which is ensured in Step S24, to an exclusion node (S27).

Subsequently, the capacity allocation processing module 30 calls out the physical chunk selection processing module 31 (FIG. 5), and requests the selection of the physical chunk PC to be associated with the logic chunk LC allocated to the target storage control module pair 25 (S28). Thus, the physical chunk selection processing module 31 receiving the request preferentially selects the physical chunk PC to be allocated to the logic chunk LC of the target storage control module pair 25 in the free physical chunks PC in the cluster 6, from the free physical chunks PC in the preferred node (here, the storage node 4 where the passive storage control modules 22 are arranged), and notifies the chunk number of the selected free physical chunk PC to the capacity allocation processing module 30.

Then, in a case where the chunk number of such a free physical chunk PC is notified from the physical chunk selection processing module 31, the capacity allocation processing module 30 ensures the physical chunk PC of the chunk number as the physical chunk PC of "mirror" (S29).

Subsequently, the capacity allocation processing module 30 prepares a new logic chunk LC, and associates the physical chunk PC ensured in Step S24 and the physical chunk PC ensured in Step S29 with the prepared logic chunk LC (S30). In addition, the capacity allocation processing module 30 allocates the logic chunk LC prepared in Step S30 to the pool PL of the target storage control module pair 25 (S31).

Then, the capacity allocation processing module 30 ends the addition capacity allocation processing. In the capacity allocation processing modules 30 of each of the storage nodes 4, the passive free capacity threshold value and the active free capacity threshold value may be set to the same value, or may be set to different values. In addition, the passive free capacity threshold value and the active free capacity threshold value may be a common value in each of the storage nodes 4, or may be different values in each of the storage nodes 4.

The capacity allocation processing module 30 of the storage node 4 may set the passive free capacity threshold value to be greater than the active free capacity threshold value. In such a case, when the free capacity of the storage node 4 is less than the passive free capacity threshold value but is greater than the active free capacity threshold value, the mirror physical chunk, which is new for the data of the passive storage control module 22, is not allocated from the storage area of the storage node, but the master physical chunk, which is new for the data of the active storage control module 22, can be allocated. Accordingly, in the storage node 4, the master physical chunk accessed from the active storage control module 22 can be preferentially allocated by the mirror physical chunk.

(1-3-4) Physical Chunk Selection Processing

Figure 14:
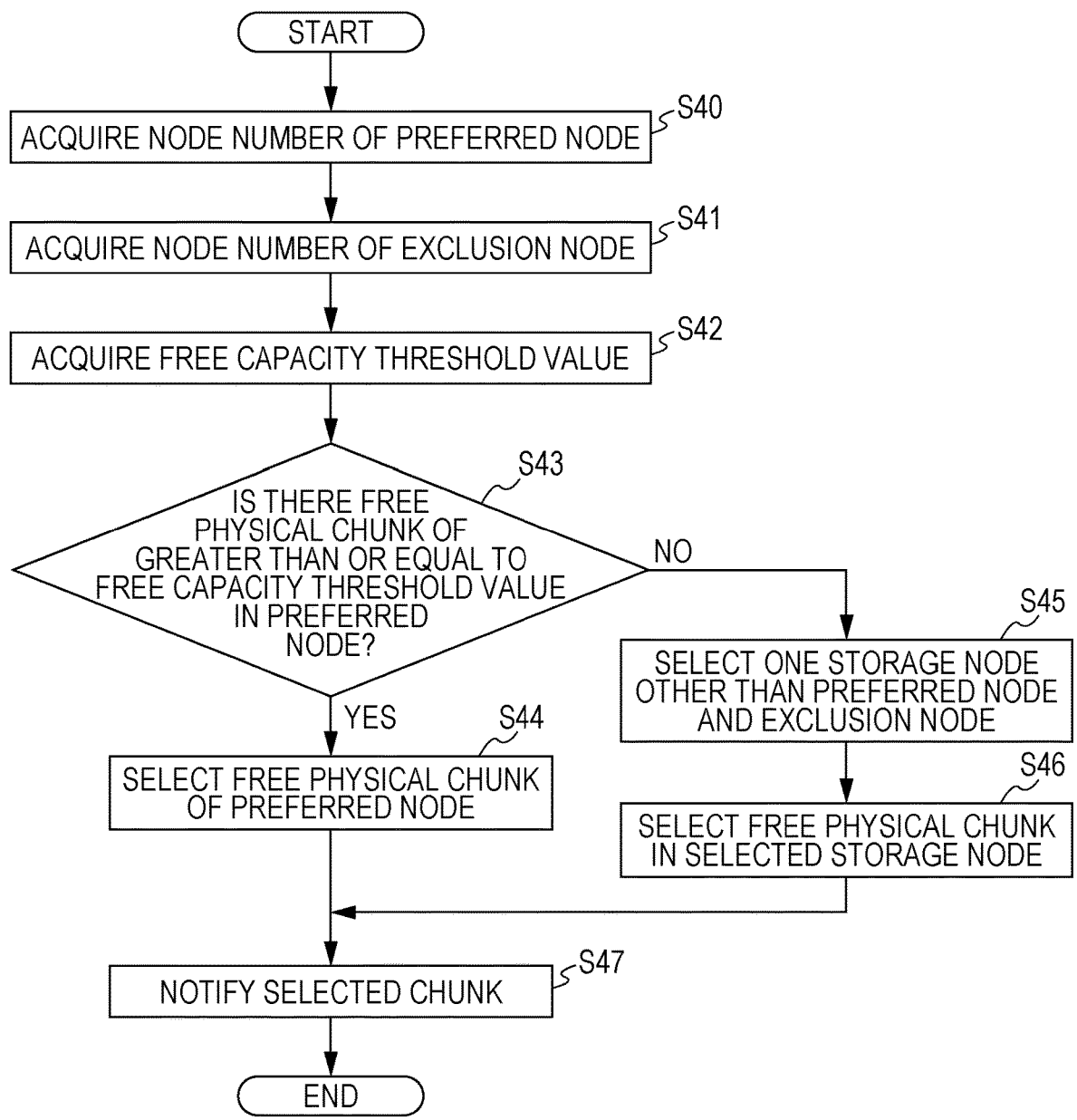
FIG. 14 is a flowchart illustrating a processing procedure of physical chunk selection processing.

FIG. 14 illustrates the processing contents of physical chunk selection processing executed by the physical chunk selection processing module 31 receiving the request of selecting the physical chunk PC associated with the logic chunk allocated to the target storage control module pair 25 from the capacity allocation processing module 30 in Step S23 and Step S28 of the capacity allocation processing described above.

In a case where such a request is applied from the capacity allocation processing module 30, the physical chunk selection processing module 31 starts the physical chunk selection processing illustrated in FIG. 14, and first, acquires node number of the preferred node which is notified from the capacity allocation processing module 30 along with such a request (S40).

In addition, in a case where the exclusion node is set, the physical chunk selection processing module 31 acquires the node number of the exclusion node which is notified from the capacity allocation processing module 30 along with such a request (S41).

Further, the physical chunk selection processing module 31 acquires the active free capacity threshold value which is notified from the capacity allocation processing module 30 along with such a request (the case of the request of Step S23), or the passive free capacity threshold value (the case of the request of Step S28) (S42).

Subsequently, the physical chunk selection processing module 31 determines whether the preferred node is not the exclusion node, and there is a free physical chunk PC of which the total capacity is greater than or equal to the active free capacity threshold value (the case of the request of Step S23) or the passive free capacity threshold value (the case of the request of Step S28) in the preferred node (S43). Furthermore, the determination is performed with reference to the number of free physical chunks management table 37 (FIG. 10).

Then, in a case where a positive result is obtained in the determination, the physical chunk selection processing module 31 selects one free physical chunk PC from the free physical chunks PC in the preferred node, with reference to the physical chunk management table 35 (FIG. 8) (S44), notifies the chunk number of the selected free physical chunk PC to the capacity allocation processing module 30 (S47), and ends the physical chunk selection processing.

In contrast, in a case where a negative result is obtained in the determination of Step S43, the physical chunk selection processing module 31 selects one storage node 4 from the storage nodes 4 other than the preferred node and the exclusion node in the cluster 6 (S45). At this time, for example, a method of selecting the storage node 4 having the largest number of free physical chunks PC with reference to the number of free physical chunks management table 37, can be applied as a selection method of the storage node 4.

Subsequently, the physical chunk selection processing module 31 selects one free physical chunk PC from the free physical chunks PC in the storage node 4 selected in Step S45 (S46). In addition, the physical chunk selection processing module 31 notifies the chunk number of the selected free physical chunk PC to the capacity allocation processing module 30 (S47), and after that, ends the physical chunk selection processing.

(1-3-5) Failover Processing

Figure 15:
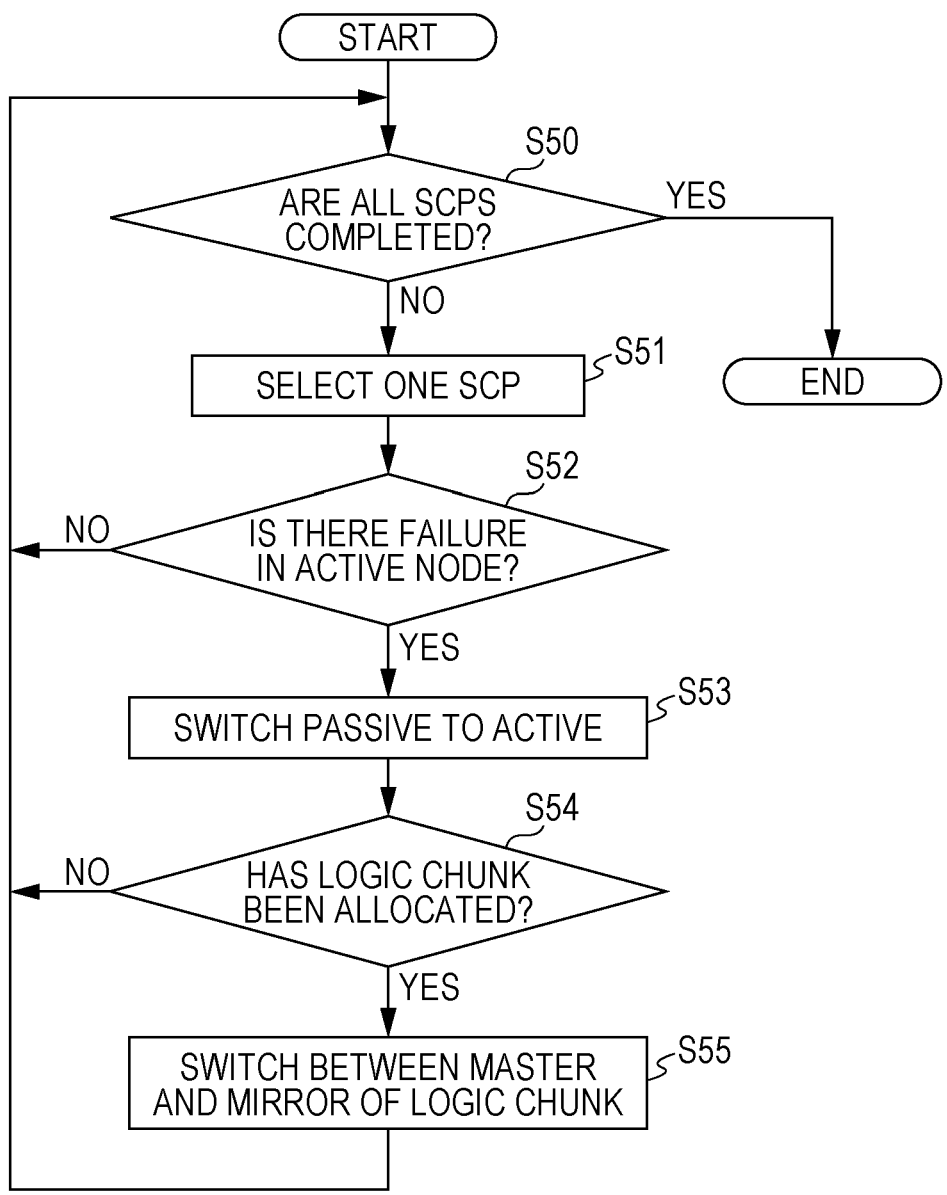
FIG. 15 is a flowchart illustrating a processing procedure of failover processing.

On the other hand, FIG. 15 illustrates a processing procedure of failover processing periodically executed by the failover processing module 32 of the capacity control module 23 (FIG. 5).

In a case where the failover processing is started, the failover processing module 32, first, determines whether or not the execution of the processing after Step S51 with respect to all of the storage control module pairs 25 in the cluster 6 is ended (S50).

Then, in a case where a negative result is obtained in the determination, the failover processing module 32 selects one storage control module pair 25, which is not yet selected in Step S51, from all of the storage control module pairs 25 in the cluster 6 (S51), and determines whether or not a failure occurs in the storage node 4 where the active storage control module 22 of the selected storage control module pair 25 (hereinafter, referred to as a first selection storage control module pair 25) is arranged (S52).

In a case where a negative result is obtained in the determination, the failover processing module 32 returns to Step S50, and after that, repeats the processing after Step S50 while sequentially switching first selection storage control module pair 25 to the other storage control module pair 25, which is not yet processed.

In contrast, in a case where a positive result is obtained in the determination of Step S52, the failover processing module 32 switches the state of the passive storage control module 22 of the first selection storage control module pair 25 to the active mode, and switches the state of the active storage control module 22 of the storage control module pair 25 to the passive mode (S53).

Subsequently, the failover processing module 32 determines whether there is the logic chunk LC allocated to the first selection storage control module pair 25, with reference to the logic chunk management table 36 (FIG. 9) (S54).

Then, in a case where a negative result is obtained in the determination, the failover processing module 32 returns to Step S50, and after that, repeats the processing after Step S50 while sequentially switching the first selection storage control module pair 25 to the other storage control module pair 25, which is not yet processed.

In contrast, in a case where a positive result is obtained in the determination of Step S54, the failover processing module 32 switches the setting of "master" and "mirror" of the physical chunk PC associated with the logic chunk LC allocated to the first selection storage control module pair 25 (S55).

Specifically, the failover processing module 32 changes the storage control module pair management table 34 such that the node number stored in the active side arrangement destination node number section 34B (FIG. 7) in a row corresponding to the first selection storage control module pair 25 in the storage control module pair management table 34 (FIG. 7), and the node number stored in the passive side arrangement destination node number section 34C (FIG. 7) in the row are replaced (S55).

Next, the failover processing module 32 returns to Step S50, and after that, repeats the processing after Step S50 while sequentially switching the first selection storage control module pair 25 to the other storage control module pair 25, which is not yet processed.

Then, in a case where a positive result is obtained in Step S50 by ending the execution of the processing after Step S52 with respect to all of the storage control module pairs 25 defined in the cluster 6, the failover processing module 32 ends the failover processing.

(1-3-6) Re-Redundancy Processing

Figure 16:
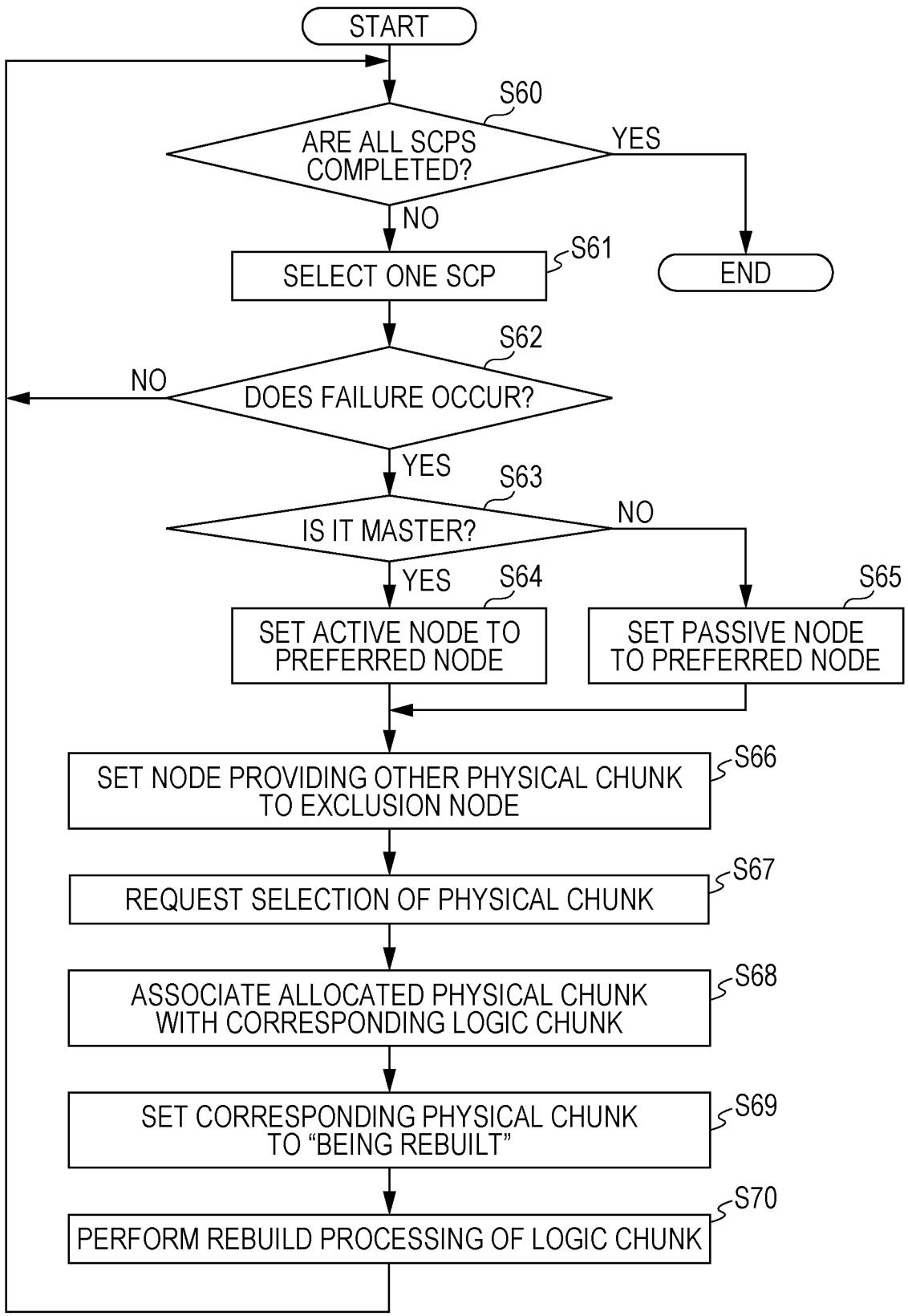
FIG. 16 is a flowchart illustrating a processing procedure of re-redundancy processing.

On the other hand, FIG. 16 illustrates a processing procedure of re-redundancy processing periodically executed by the re-redundancy processing module 33 of the capacity control module 23 (FIG. 5).

In a case where the re-redundancy processing is started, the re-redundancy processing module 33, first, determines whether or not the execution of the processing after Step S61 with respect to all of the storage control module pairs 25 in the cluster 6 is ended (S60).

Then, in a case where a negative result is obtained in the determination, the re-redundancy processing module 33 selects one storage control module pair 25, which is not yet selected in Step S61, from all of the storage control module pairs 25 in the cluster 6 (S61), and determines whether or not a failure occurs in the storage device 13 providing any physical chunk PC associated with any logic chunk LC allocated to the selected storage control module pair (hereinafter, referred to as a second selection storage control module pair) 25, or in the storage node 4 on which the storage device 13 is mounted (S62).

In a case where a negative result is obtained in the determination, the re-redundancy processing module 33 returns to Step S60, and after that, repeats the processing after Step S60 while sequentially switching the second selection storage control module pair 25 to the other storage control module pair 25, which is not yet processed.

In contrast, in a case where a positive result is obtained in the determination of Step S62, the re-redundancy processing module 33 determines whether or not the physical chunk (hereinafter, referred to as a failure physical chunk) PC provided by the storage node 4 in which such a failure occurs, is the physical chunk PC set to "master" (S63).

Then, in a case where a positive result is obtained in the determination, the re-redundancy processing module 33 sets the storage node 4 in which the active storage control modules 22 of the second selection storage control module pair 25 are arranged, to the preferred node (S64). In addition, in a case where a negative result is obtained in the determination of Step S63, the re-redundancy processing module 33 sets the storage node 4 in which the passive storage control modules 22 of the second selection storage control module pair 25 are arranged, to the preferred node (S65).

Subsequently, the re-redundancy processing module 33 sets the storage node 4, which provides any physical chunk PC associated with any logic chunk LC allocated to the second selection storage control module pair 25 and is the storage node 4 in which a failure does not occur, to the exclusion node (S66).

Next, the re-redundancy processing module 33 selects the physical chunk PC, which is an alternative of the failure physical chunk PC detected in Step S62, by calling out the physical chunk selection processing module 31 (FIG. 5) and executing the physical chunk selection processing described in FIG. 14 (S67).

Then, the re-redundancy processing module 33 associates the physical chunk (hereinafter, referred to as a selected physical chunk) PC selected by the physical chunk selection processing module 31 in Step S67, with the corresponding logic chunk (hereinafter, referred to as a re-redundancy target logic chunk) LC allocated to the second selection storage control module pair 25 instead of the failure physical chunk PC detected in Step S62 (S68).

Specifically, the re-redundancy processing module 33 rewrites the master physical chunk number section 36C (a case where the failure physical chunk PC is "master") in a row corresponding to the re-redundancy target logic chunk PC in the logic chunk management table 36 (FIG. 9) or the chunk number of the failure physical chunk PC stored in the mirror physical chunk number section 36D (a case where the failure physical chunk PC is "mirror") to the chunk number of the selected physical chunk PC.

In addition, in Step S68, the re-redundancy processing module 33 changes a numerical number stored in the number of free physical chunks section 37B (FIG. 10) in a row corresponding to the storage node 4 providing the selected physical chunk PC in the number of free physical chunks management table 37 (FIG. 10) to a value decreased by "1".

Further, in the case of the physical chunk PC in which the failure physical chunk PC is set to "master", in Step S68, the re-redundancy processing module 33 switches the physical chunk PC provided by the storage node 4 in which the active storage control modules 22 are arranged, in the physical chunks PC which are the physical chunks PC associated with the re-redundancy target logic chunk LC along with the failure physical chunk PC, and are set to "mirror", to "master". Specifically, the re-redundancy processing module 33 replaces the chunk number stored in the master physical chunk number section 36C (FIG. 9) in a row corresponding to the re-redundancy target logic chunk LC in the logic chunk management table 36 (FIG. 9), and the chunk number stored in the mirror physical chunk number section 36D (FIG. 9) in the row.

After that, the re-redundancy processing module 33 sets the state of the selected physical chunk PC to "being rebuilt" (S69). In addition, the re-redundancy processing module 33 executes rebuild processing decompressing the data, which has been stored in the failure physical chunk PC, to the selected physical chunk PC (S70).

Specifically, in a case where the data stored in the failure physical chunk PC is mirrored in the other physical chunk PC, the re-redundancy processing module 33 fully copies the data stored in the other physical chunk PC to the selected physical chunk PC. In addition, in a case where the data stored in the failure physical chunk PC is a part of the data of erasure-coding, the data is decompressed by using the other data, and the decompressed data is stored in the selected physical chunk PC.

Then, in a case where the rebuild processing is completed, the re-redundancy processing module 33 returns to Step S60, and after that, repeats the processing after Step S60 while sequentially switching the second selection storage control module pair 25 to the other storage control module pair 25, which is not yet processed.

Then, in a case where a positive result is obtained in Step S60 by ending the execution of the processing after Step S61 with respect to all of the storage control module pairs 25 defined in the cluster 6, the re-redundancy processing module 33 ends the re-redundancy processing.

(1-4) Effect of this Embodiment

In the information processing system 1 of this embodiment configured as described above, at least two physical chunks PC are allocated to the storage control module pair 25, and the data is duplexed and is stored in these physical chunks PC, and thus, the data is protected.

In addition, in this information processing system 1, the physical chunk PC provided by the storage device 13 in the storage node 4 where the active storage control modules 22 configuring the storage control module pair 25 are arranged, and the physical chunk PC provided by the storage device 13 in the storage node 4 where the passive storage control modules 22 configuring the storage control module pair 25 are arranged, are selected as two physical chunks PC.

Accordingly, the active storage control module 22 configuring the storage control module pair 25 or the passive storage control module 22 switched to be in the active mode is capable of promptly accessing the corresponding physical chunk PC in the physical chunks PC, and the reading/writing of the data with respect to the physical chunk PC is capable of being promptly performed.

Accordingly, according to this information processing system 1, the data protection can be performed while preventing deterioration in the response performance of the entire system.

(2) Second Embodiment

(2-1) Configuration of Information Processing System According to Second Embodiment As with the first embodiment, in a case where the logic chunk LC is allocated to the storage control module pair 25, and the plurality of physical chunks PC are associated with the logic chunk LC, and thus, the data is subjected to redundancy, it is desirable that a fault set is also considered at the time of selecting the physical chunk PC associated with the logic chunk LC. Here, "fault set" indicates a group of the storage nodes 4 in which a failure may occur due to a single power failure.

For example, even though the plurality of physical chunks PC associated with one logic chunk LC are selected from the physical chunks PC provided by the storage nodes 4 different from each other in order to prevent the occurrence of data lost due to a failure of one storage node 4, in a case where the storage nodes 4 acquire electric power from the same power, the reading/writing of the data with respect to all of the physical chunks PC associated with the logic chunk LC is not capable of being performed in a stage where the power is broken down.

Therefore, in this embodiment, when the plurality of physical chunks PC are associated with the logic chunk LC, the physical chunk PC associated with the logic chunk LC is selected in consideration of the fault set. Specifically, the physical chunks PC provided by each of the storage nodes 4 belonging to the fault sets different from each other, are selected as the physical chunk PC associated with one logic chunk LC.

In addition, even though the physical chunks PC provided by each of the storage nodes 4 belonging to different fault sets are selected as the physical chunk PC associated with one logic chunk LC, in a case where the storage node 4 where each of the storage nodes 4 configuring the storage control module pair 25 to which the logic chunk LC is allocated, is arranged, belongs to the same fault set, it is not possible to correspond the I/O request from the host device 3 in a case where a power failure occurs in the fault set.

Therefore, in this embodiment, the storage control module pair 25 is configured of two storage control modules 22 arranged in the storage nodes 4 belonging to the fault sets different from each other.

Figure 17:
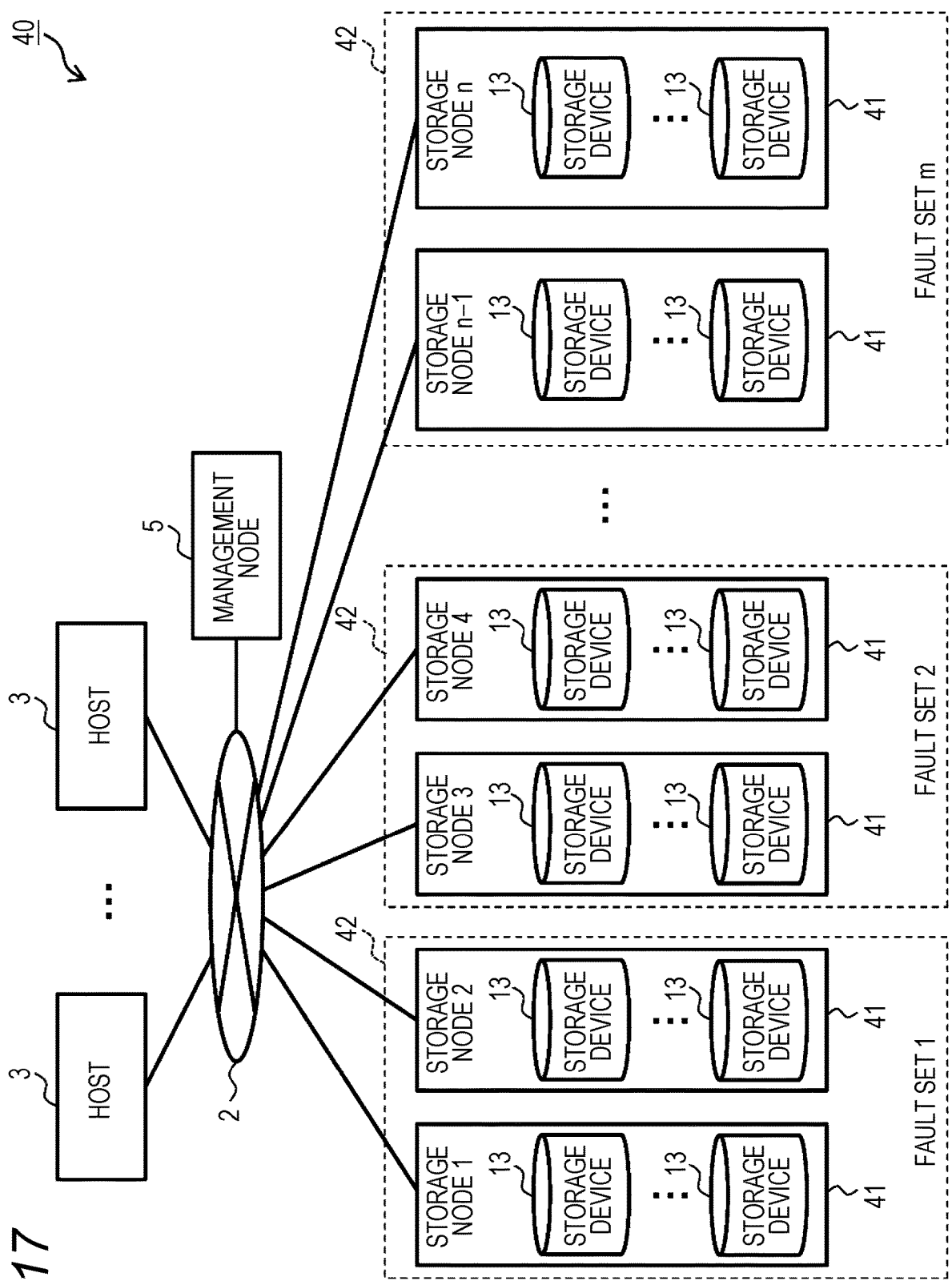
FIG. 17 is a block diagram illustrating an overall configuration of an information processing system according to a second embodiment.

FIG. 17 illustrates a schematic configuration example of an information processing system 40 according to this embodiment in consideration of "fault set" as described above, by applying the same reference numerals to the corresponding portions of FIG. 1. Here, two storage nodes 41 of "storage node 1" and "storage node 2" belong to a fault set 42 of "fault set 1", and storage nodes 41 of "storage node 4" and "storage node 4" belong to a fault set 42 of "fault set 2", . . . , and storage nodes 41 of "storage node (2n−1)" and "storage node 2$_n$," belong to a fault set 42 of "fault set n".

Furthermore, a hardware configuration of each of the storage nodes 41 is identical to that of the storage node 4 of the first embodiment, and thus, the description thereof will be omitted.

Figure 18:
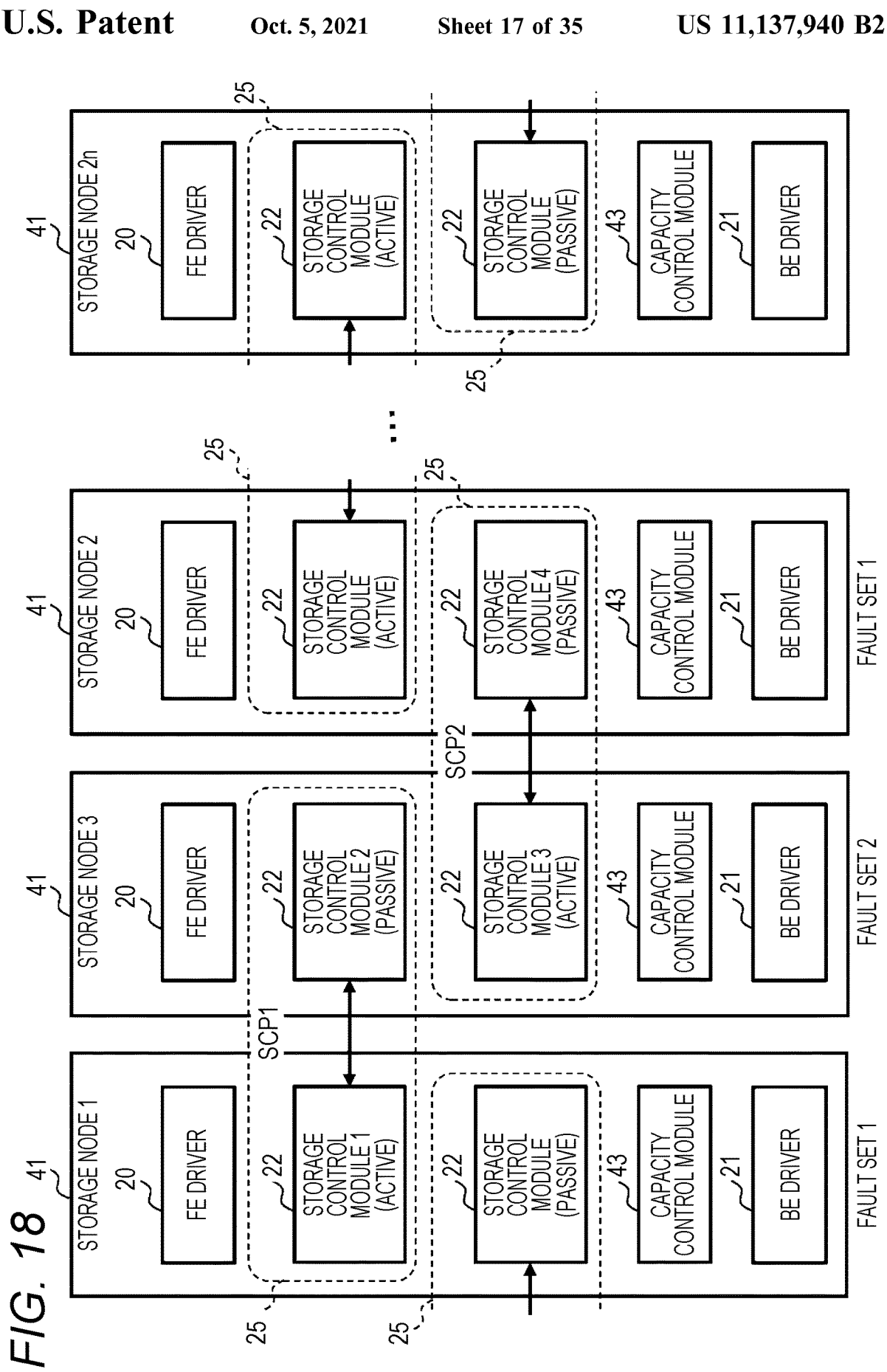
FIG. 18 is a block diagram illustrating a configuration example of a storage control module pair in consideration of a fault set.

FIG. 18 illustrates a configuration example of each of the storage control module pairs 25 defined in the information processing system 40 of this embodiment, by applying the same reference numerals to the corresponding portions of FIG. 3. As illustrated in FIG. 18, in the case of this embodiment, each of the storage control module pairs 25 is configured of two storage control modules 22 respectively arranged in the storage nodes 41 belonging to the fault sets 42 different from each other.

For example, in the case of the example of FIG. 18, the storage control module pair 25 of "storage control module pair 1 (SCP1)" is configured of the storage control module 22 of "storage control module 1" arranged in the storage node 41 of "storage node 1" belonging to the fault set of "fault set 1", and the storage control module 22 of "storage control module 2" arranged in the storage node 41 of "storage node 3" belonging to the fault set of "fault set 2".

In addition the storage control module pair 25 of "storage control module pair 2 (SCP2)" is configured of the storage control module 22 of "storage control module 3" arranged in the storage node 41 of "storage node 3" belonging to the fault set of "fault set 2", and the storage control module 22 of "storage control module 4" arranged in the storage node 41 of "storage node 2" belonging to the fault set of "fault set 1".

A configuration setting of each of the storage control module pairs 25, for example, may be performed with respect to each of the storage nodes 4 through the management node 5 after the system manager grasps the fault set of each of the storage nodes 4. In addition, any storage node 4 (for example, the storage node 4 selected in the cluster 6 as the representative) may configure the storage control module pair 25 from two storage control modules 22 arranged in the storage nodes 41 belonging to the different fault sets 42, with reference to a node management table 44 described below, in FIG. 20.

Figure 19:
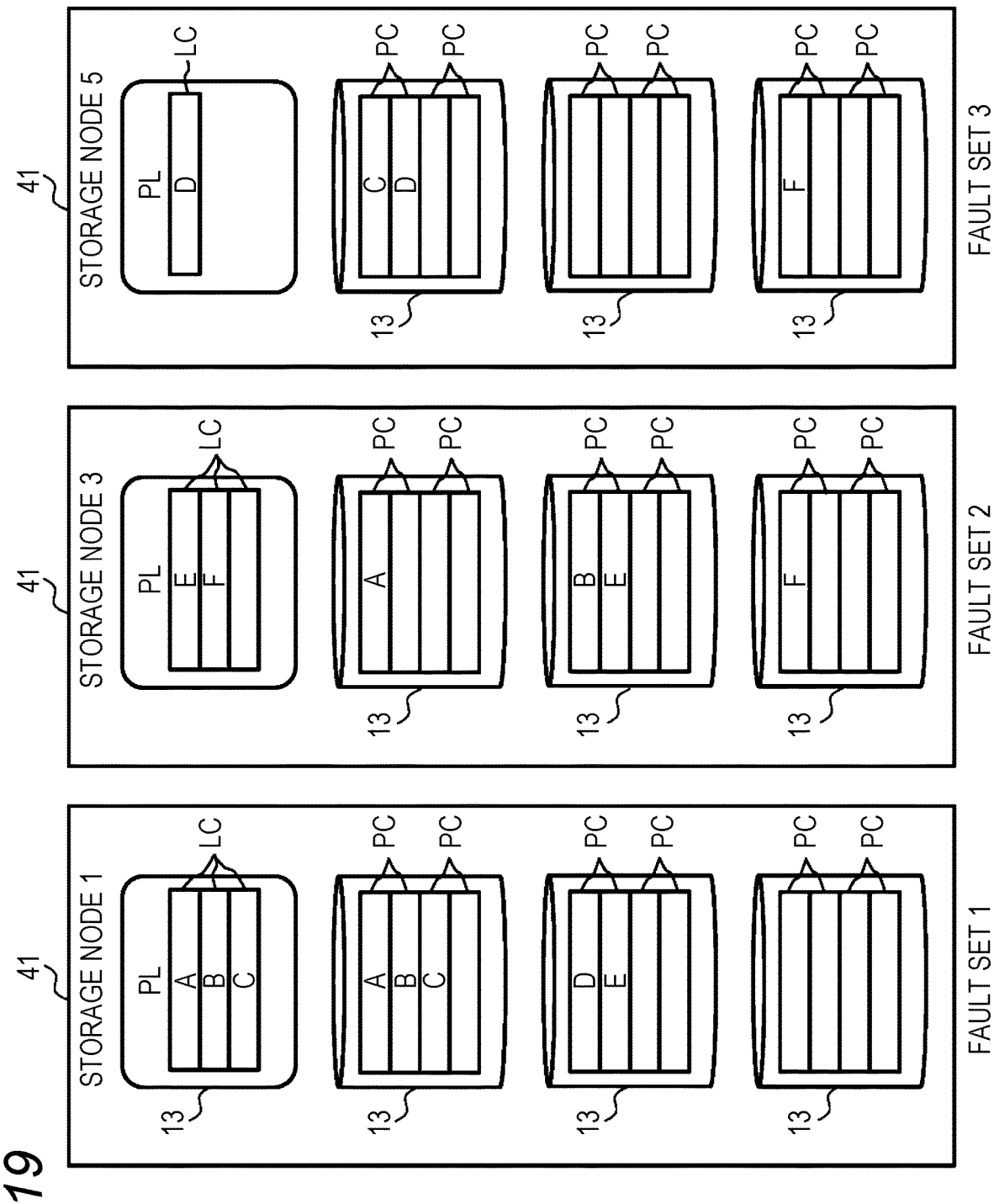
FIG. 19 is a block diagram illustrating association between a logic chunk and a physical chunk in the second embodiment.

In the information processing system 40 of this embodiment, FIG. 19 illustrates an example of a case where two physical chunks PC are associated with one logic chunk LC. As illustrated in FIG. 19, in the case of this embodiment, the plurality of physical chunks PC provided by the storage devices 13 in the storage node 41 belonging to the fault sets different from each other are associated with one logic chunk LC.

For example, in the case of the example of FIG. 19, the physical chunk PC of "A" provided by the storage device 13 in the storage node 41 of "storage node 3" belonging to the fault set of "fault set 1", and the physical chunk PC of "A" provided by the storage device 13 in the storage node 41 of "storage node 5" belonging to the fault set of "fault set 3" are associated with the logic chunk LC of "A".

In addition, the physical chunk PC of "B" provided by the storage device 13 in the storage node 41 of "storage node 1" belonging to the fault set of "fault set 1", and the physical chunk PC of "B" provided by the storage device 13 in the storage node 41 of "storage node 3" belonging to the fault set of "fault set 2" are associated with the logic chunk LC of "B".

Figure 20:
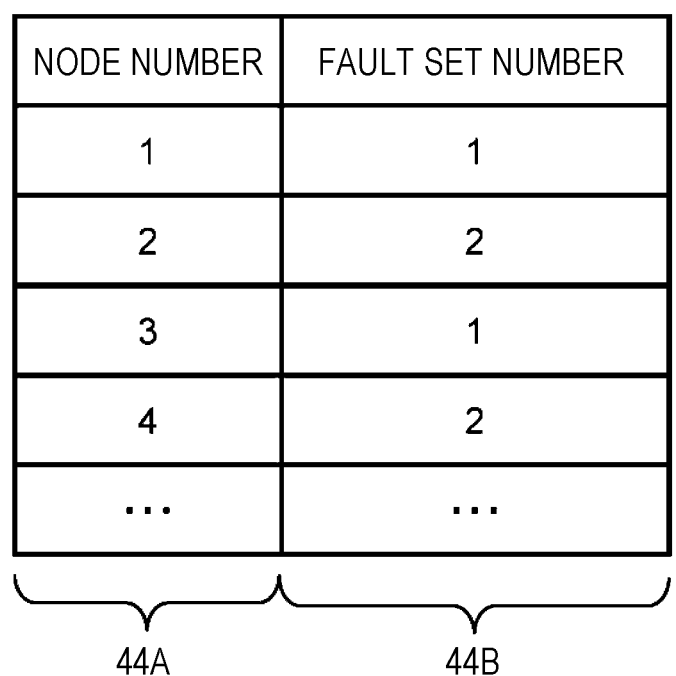
FIG. 20 is a graphic chart illustrating a configuration of a node management table.

FIG. 20 illustrates a node management table 44 stored in the memory 12 (FIG. 2) of each of the storage nodes 41 of this embodiment, in addition to the frontend driver 20, the backend driver 21, one or the plurality of storage control modules 22, the storage control module pair management table 34, the physical chunk management table 35, the logic chunk management table 36, and the number of free physical chunks management table 37 according to the first embodiment, described above in FIG. 6 to FIG. 10.

The node management table 44 is a table which is used by the capacity control module 43 (FIG. 18) of this embodiment in order to manage the fault sets to which each of the storage nodes 41 belongs, and as illustrated in FIG. 20, includes a node number section 44A and a fault set number section 44B.

Then, all of the node numbers applied to each of the storage nodes 4 in the cluster 6 are stored in the node number section 44A, and a unique number (fault set number) of the fault set, which is applied to the fault set to which the corresponding storage node 4 belongs, is stored in the fault set number section 44B.

Accordingly, in the case of the example of FIG. 20, for example, it is illustrated that the storage node 41 to which the node number of "1" is applied and the storage node 41 to which the node number of "3" is applied belong to the fault set to which the fault set number of "1" is applied, the storage node 41 to which the node number of "2" is applied and the storage node 41 to which the node number of "4" is applied belong to the fault set to which the fault set number of "2" is applied.

Figure 21:
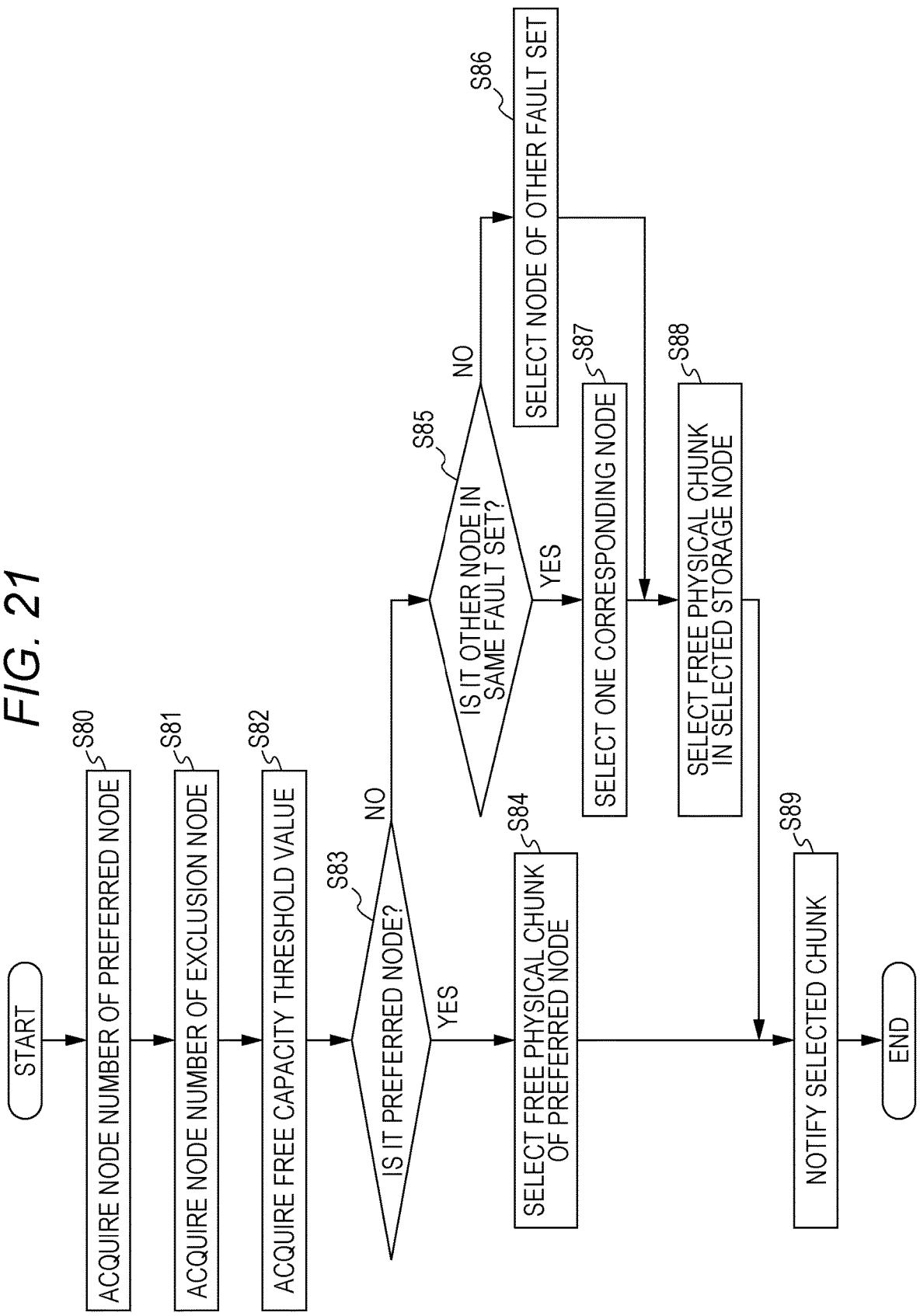
FIG. 21 is a flowchart illustrating a processing procedure of physical chunk selection processing according to the second embodiment.

FIG. 21 illustrates a processing procedure of physical chunk selection processing according to this embodiment, which is executed by the physical chunk selection processing module 45 (FIG. 5) of the capacity control module 43 (FIG. 18) of this embodiment, instead of the physical chunk selection processing module 31 of the capacity control module 23 of the first embodiment described in FIG. 14. Furthermore, the other processing contents of the capacity control module 43 are identical to those of the capacity control module 23 of the first embodiment, and thus, the description thereof will be omitted.

In a case where the physical chunk selection processing module 45 of the capacity control module 43 of this embodiment is called out in Step S23 or Step S28 of the capacity allocation processing described in FIG. 13, the physical chunk selection processing module 45 starts the physical chunk selection processing illustrated in FIG. 21, and performs the processing of Step S80 to Step S83 as with the processing of Step S40 to Step S43 of FIG. 14.

Then, in a case where a positive result is obtained in the determination of Step S83, the physical chunk selection processing module 45 performs the processing of Step S84 and Step S89 as with the processing of Step S44 and Step S47 of the capacity allocation processing described in FIG. 14, and after that, ends the physical chunk selection processing.

In contrast, in a case where a negative result is obtained in the determination of Step S83, the physical chunk selection processing module 45 determines whether the storage node 41 is any other storage node 41 belonging to the same fault set as that of the preferred node, the storage node 41 is not the exclusion node, and there is the free physical chunk PC of which the total capacity is greater than or equal to the active free capacity threshold value (the case of the request of Step S23) or the passive free capacity threshold value (the case of the request of Step S28) in the storage node 41 (S85). Furthermore, the determination is performed with reference to the number of free physical chunks management table 37 (FIG. 10).

Then, in a case where a positive result is obtained in the determination, the physical chunk selection processing module 45 selects one storage node 41 from the storage nodes 41 satisfying the condition of Step S83 (S87). At this time, for example, a method of selecting the storage node 41 having the largest number of free physical chunks PC in the storage nodes 41 satisfying the condition of Step S85, with reference to the number of free physical chunks management table 37, can be applied as a selection method of the storage node 41. Here, the storage node 41 may be selected according to the other method.

Subsequently, the physical chunk selection processing module 45 selects one free physical chunk PC from the free physical chunks PC in the selected storage node 41 (S88). In addition, the physical chunk selection processing module 45 notifies the chunk number of the physical chunk PC selected in Step S88 to the capacity allocation processing module 30 (FIG. 5) (S89), and after that, ends the physical chunk selection processing.

On the other hand, in a case where a negative result is obtained in the determination of Step S85, the physical chunk selection processing module 45 selects one storage node 41 which is any storage node 41 belonging to a fault set different from that of the preferred node, is not the exclusion node, and includes the free physical chunk PC of which the total capacity is greater than or equal to the active free capacity threshold value (the case of the request of Step S23) or the passive free capacity threshold value (the case of the request of Step S28) in the storage node 41, with reference to the number of free physical chunks management table 37 (S86).

In addition, the physical chunk selection processing module 45 selects one free physical chunk from the free physical chunks PC in the storage node 41 selected in Step S86 (S88). Further, the physical chunk selection processing module 45 notifies the chunk number of the physical chunk PC selected in Step S88 to the capacity allocation processing module 30 (S89), and after that, ends the physical chunk selection processing.

Thus, in the information processing system 40 of this embodiment, the physical chunk PC associated with the logic chunk LC is selected in consideration of the fault set in addition to the configuration of the first embodiment, and thus, it is possible to reliably prevent the reading/writing of the data with respect to all of the physical chunks PC associated with the storage control module pair 25 from not being performed due to a single power failure.

Accordingly, according to this embodiment, it is possible to obtain an effect in which an information processing system having higher availability and reliability can be structured, in addition to the effect obtained by the first embodiment.

(3) Third Embodiment

Figure 22:
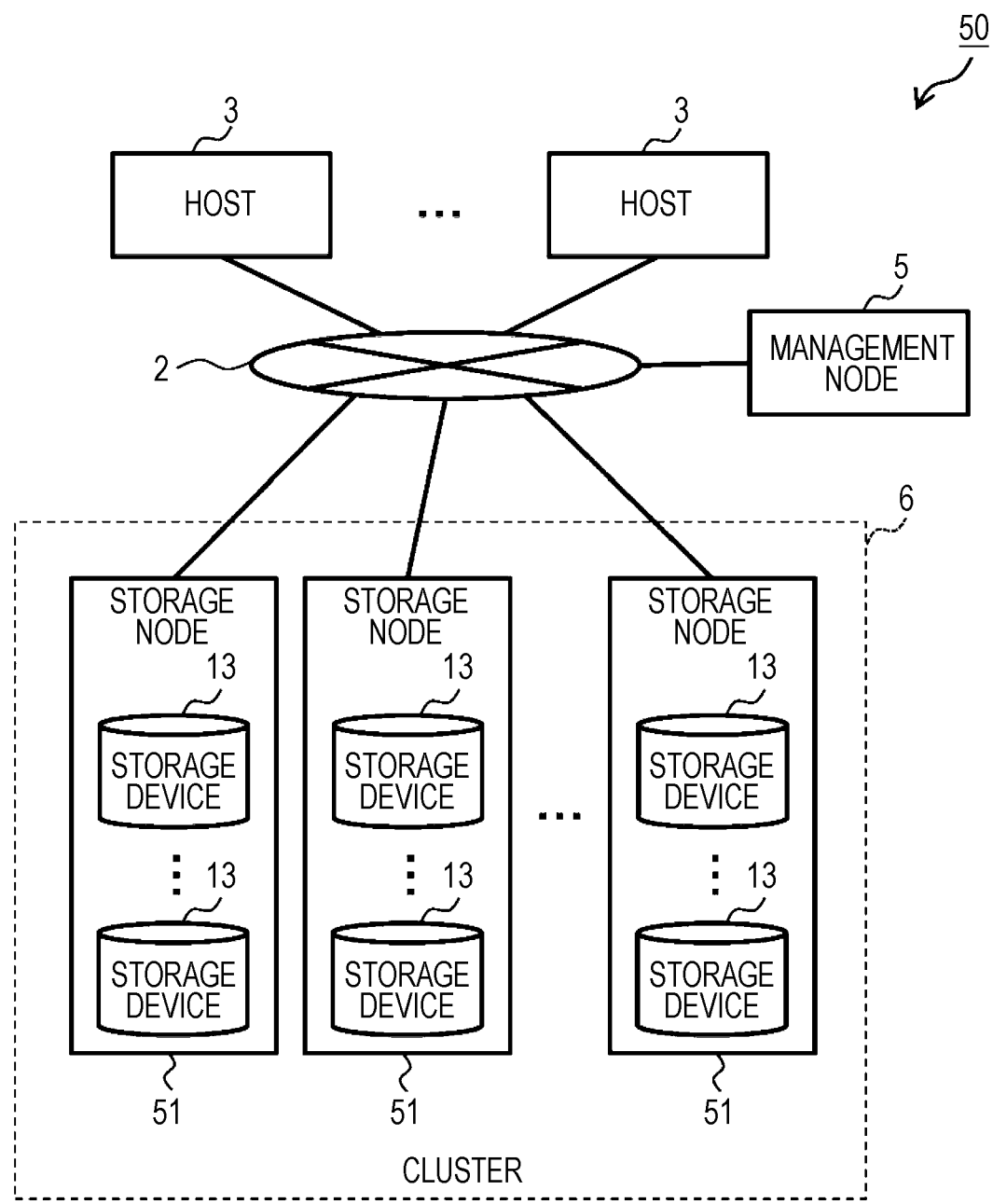
FIG. 22 is a block diagram illustrating an overall configuration of an information processing system according to a third embodiment.

FIG. 22 illustrates an overall configuration of an information processing system 50 of a third embodiment by applying the same reference numerals to the corresponding portions of FIG. 1. This information processing system 50 is different from the information processing system 1 of the first embodiment in that a hierarchical control function and a capacity allocation function according to the hierarchical control function are respectively implemented in the storage nodes 51. The other functions of the information processing system 50 of this embodiment are approximately identical to those of the information processing system 1 of the first embodiment, and thus, the description thereof will be omitted.

First, the hierarchical control function will be described. The hierarchical control function is a function of grouping the storage area provided by the storage device 13 in a plurality of storage hierarchies (tiers) according to a response speed of the storage device 13, and of storing data having a higher access frequency in a storage area of a storage hierarchy having a high response speed.

For this reason, in the case of this embodiment, each of a plurality of types of storage devices 13 having different response speeds is mounted on each of the storage nodes 51, and the physical chunk PC provided by the same type of storage device 13 is managed as the storage area of the same storage hierarchy.

For example, in a case where three types of storage devices 13 of SSD, a SAS hard disk device, and a SATA hard disk device are mounted on each of the storage nodes, the physical chunk PC provided by the SSD having the highest response speed is managed as a storage area of a first storage hierarchy, the physical chunk PC provided by the SAS hard disk device having the next highest response speed is managed as a storage area of a second storage hierarchy, and the physical chunk PC provided by the SATA hard disk device having the lowest response speed is managed as a storage area of a third storage hierarchy.

Then, processing is periodically executed, in which the access frequency of each of the data items stored in each of the of storage areas of each of the storage hierarchies is managed, the data having the highest access frequency is moved to the storage area of the first storage hierarchy, the data the next highest access frequency is moved to the storage area of the second storage hierarchy, and the data having the lowest access frequency is moved to the storage area of the third storage hierarchy.

According to such a hierarchical control function, there is an advantage in that it is possible to store and retain the data having a low access frequency by a low-cost storage device 13 while maintaining response performance with respect to the data having a high access frequency, and thus, it is possible to suppress the cost of the entire system to be low.

Figure 23:
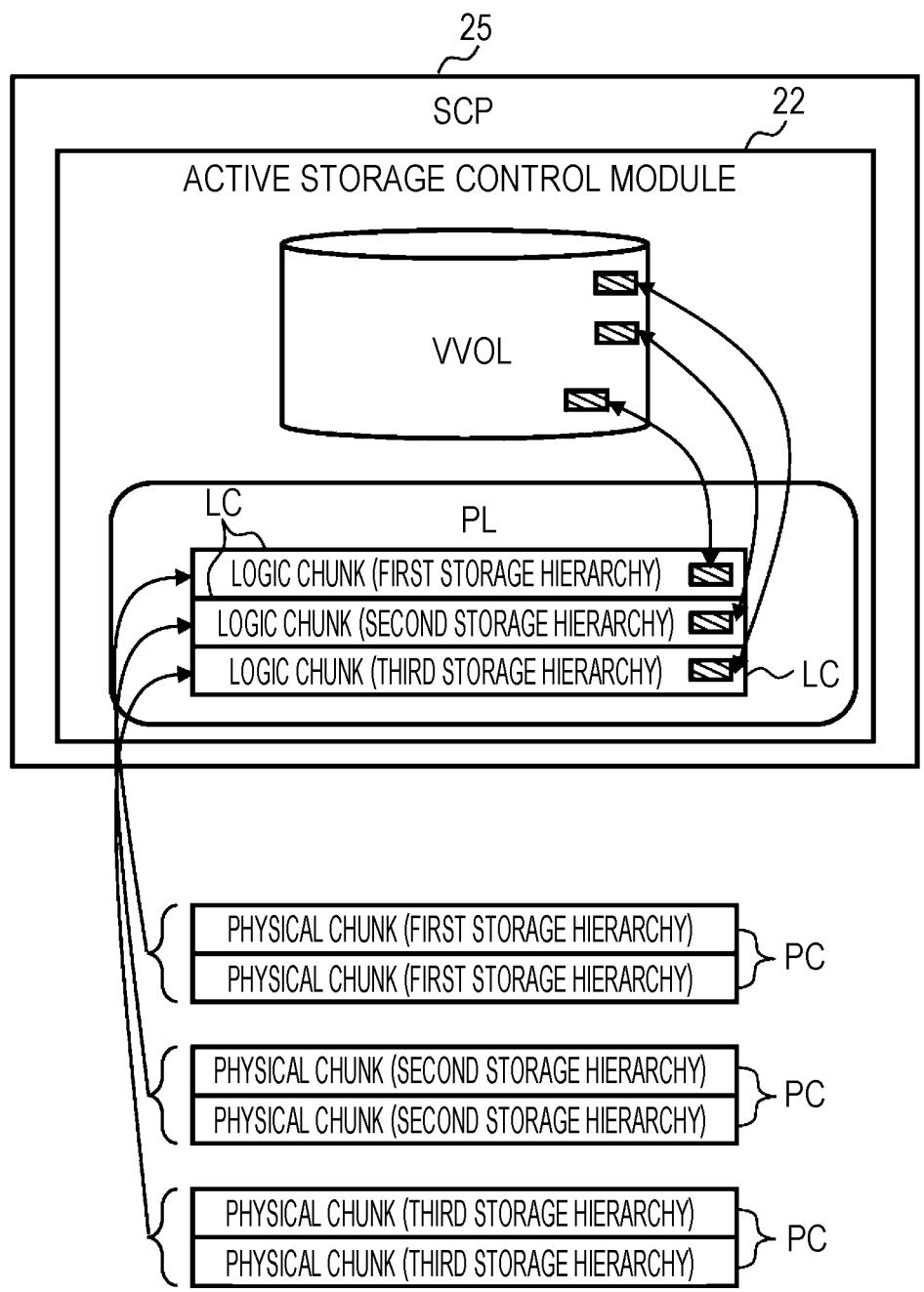
FIG. 23 is a block diagram illustrating a hierarchical control function in the information processing system of the third embodiment.

In the information processing system 50 of this embodiment, as illustrated in FIG. 23, the plurality of logic chunks LC associated with the physical chunks PC of the storage hierarchies different from each other are allocated to the pools PL allocated to each of the storage control module pairs 25, in order to correspond to such a hierarchical control function. Furthermore, hereinafter, it will be described that the logic chunks LC of three storage hierarchies (the first storage hierarchy to the third storage hierarchy) are respectively associated with the storage control module pairs 25, but the number of storage hierarchies of the logic chunks LC associated with the storage control module pairs 25 may be other than 3.

Then, in the case of applying the write request in which the virtual volume VVOL associated with the storage control module pair 25 to which the active storage control modules 22 belongs is set to the write target virtual volume VVOL, the active storage control modules 22 of each of the storage control module pairs 25, first, allocates the logic area of the logic chunk LC associated with the physical chunk PC of the first storage hierarchy having the highest response performance to the write destination area in the write target virtual volume VVOL designated in the write request.

After that, the active storage control module 22 monitors the access frequency of each of the data items written on the write target virtual volume VVOL, and according to the access frequency with respect to the data, switches the logic area of the logic chunk LC associated with the storage area of the virtual volume VVOL, on which the data is written, to the logic area in the logic chunk LC belonging to the highest storage hierarchy, with respect to the highest access frequency data, as necessary. According to this, the active storage control module 22 moves the data to the corresponding storage area in the physical chunk PC associated with the logic chunk LC after the switching.

In addition, the active storage control module 22 switches the logic area of the logic chunk LC associated with the storage area of the virtual volume VVOL, on which the data is written, to the logic area of the logic chunk LC belonging to the next highest storage hierarchy, with respect to the data having the next highest access frequency, and moves the data to the corresponding storage area in the physical chunk PC associated with the logic chunk LC after the switching.

Further, the active storage control module 22 switches the logic area of the logic chunk LC associated with the storage area of the virtual volume VVOL, on which the data is written, to the logic area of the logic chunk LC belonging to the lowest storage hierarchy, with respect to the data having the lowest access frequency, and moves the data to the corresponding storage area in the physical chunk PC associated with the logic chunk LC after the switching.

Figure 24:
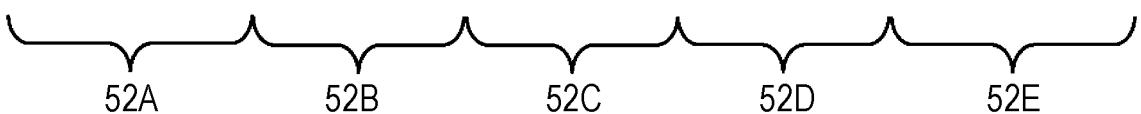
FIG. 24 is a graphic chart illustrating a configuration of a physical chunk management table in the third embodiment.
Figure 25:
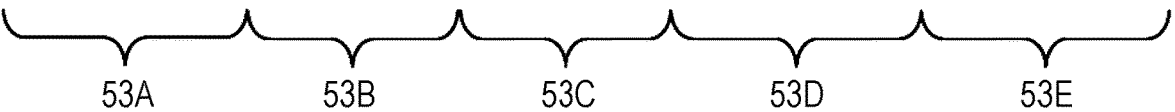
FIG. 25 is a graphic chart illustrating a configuration of a logic chunk management table in the third embodiment.

As means for realizing such a capacity allocation function of this embodiment, the memory 12 (FIG. 2) of each of the storage nodes 51 of this embodiment stores a physical chunk management table 52 illustrated in FIG. 24 instead of the physical chunk management table 35 described in FIG. 8, a logic chunk management table 53 illustrated in FIG. 25 instead of the logic chunk management table 36 described in FIG. 9, and a number of free physical chunks management table 54 illustrated in FIG. 26 instead of the number of free physical chunks management table 37 described in FIG. 10.

Then, a medium type section 52C is provided in the physical chunk management table 52 of this embodiment, in addition to a physical chunk number section 52A, an affiliation node number section 52B, a drive number section 52D, and an in-drive offset section 52E, in which the same information as that of each of the physical chunk number section 35A, the affiliation node number section 35B, the drive number section 35C, and the in-drive offset section 35D of the physical chunk management table 35, described in FIG. 8, is stored. Then, a medium type (SSD, SAS, SATA, or the like) of the storage device 13 providing the corresponding physical chunk PC is stored in the medium type section 52C.

Accordingly, in the case of the example of FIG. 24, it is illustrated that the physical chunk PC of which the physical chunk number is "0" to "2", "4", or "5" is the physical chunk provided by the storage device 13 of which the medium type is "SSD", the physical chunk PC of which the physical chunk number is "3" is the physical chunk provided by the storage device 13 of which the medium type is "SAS", and the physical chunk PC of which the physical chunk number is "6" and "7" is the physical chunk provided by the storage device 13 of which the medium type is "SATA".

In addition, a medium type section 53C is provided in the logic chunk management table 53 of this embodiment, in addition to a logic chunk number section 53A, an allocation destination storage control module pair number section 53B, a master physical chunk number section 53D, and a mirror physical chunk number section 53E, in which the same information as that of each of the logic chunk number section 36A, the allocation destination storage control module pair number section 36B, the master physical chunk number section 36C, and the mirror physical chunk number section 36D of the logic chunk management table 36, described in FIG. 9, is stored. Then, a medium type of the storage device 13 providing the physical chunk PC associated with the corresponding logic chunk LC is stored in the medium type section 53C.

Accordingly, in the case of the example of FIG. 25, it is illustrated that all of the logic chunks LC of which the logic chunk number is "0" or "1" are the logic chunk associated with the physical chunk PC provided by the storage device 13 of which the medium type is "SSD", and the logic chunk LC of which the logic chunk number is "2" is the logic chunk associated with the physical chunk PC provided by the storage device 13 of which the medium type is "SAS".

Further, number of free physical chunks sections 54C, 54D, and 54E, respectively corresponding to the storage hierarchies, are provided in the number of free physical chunks management table 54 of this embodiment, in addition to a node number section 54A and a number of free physical chunks section 54B, in which the same information as that of each of the node number section 37A and the number of free physical chunks section 37B of the number of free physical chunks management table 37, described in FIG. 10, is stored. Then, the number of free physical chunks PC in the physical chunks PC provided by the storage device 13 of the medium type configuring the each of the corresponding storage hierarchies is stored in the number of free physical chunks sections 54C to 54E.

Accordingly, in the case of the example of FIG. 26, for example, it is illustrated that in the storage node 51 of which the node number is "1", at this time, the number of free physical chunks PC provided by the storage device 13 of the medium type of "SSD" configuring the first storage hierarchy is "5", the number of free physical chunks PC the provided by the storage device 13 of the medium type of "SAS" configuring the second storage hierarchy is "2", and the number of free physical chunks PC provided by the storage device 13 of the medium type of the "SATA" configuring the third storage hierarchy is "3". Furthermore, as described above, which medium type of the storage device 13 belongs to which storage hierarchy, is set in advance.

Figure 27:
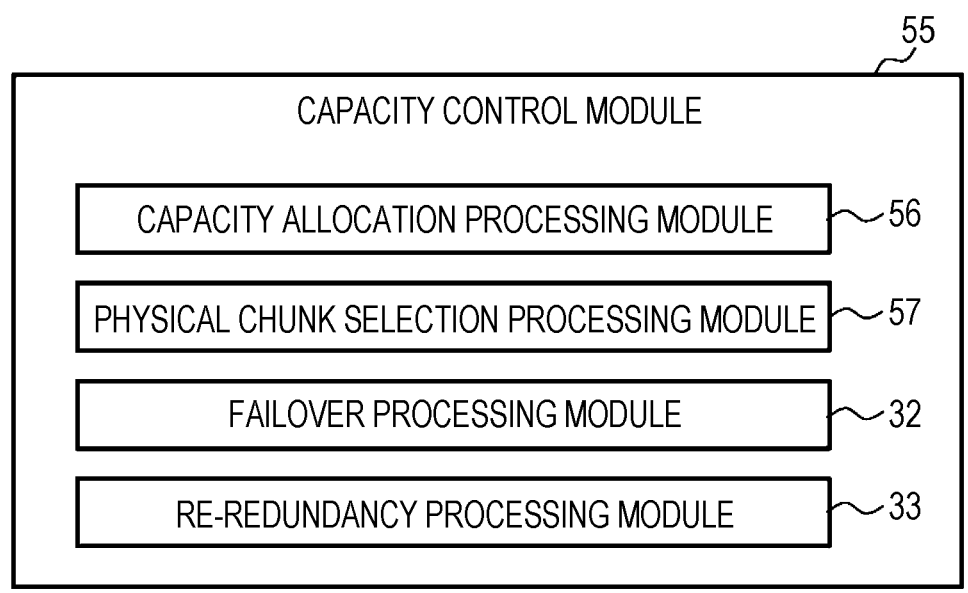
FIG. 27 is a block diagram illustrating a detailed configuration of a capacity control module according to the third embodiment.

FIG. 27 illustrates a configuration of a capacity control module 55 of this embodiment, by applying the same reference numerals to the corresponding portions of FIG. 5. The capacity control module 55 of this embodiment has the same configuration as that of the capacity control module 23 (FIG. 5) of the first embodiment except that the processing contents of a capacity allocation processing module 56 and a physical chunk selection processing module 57 are different.

Figure 28:
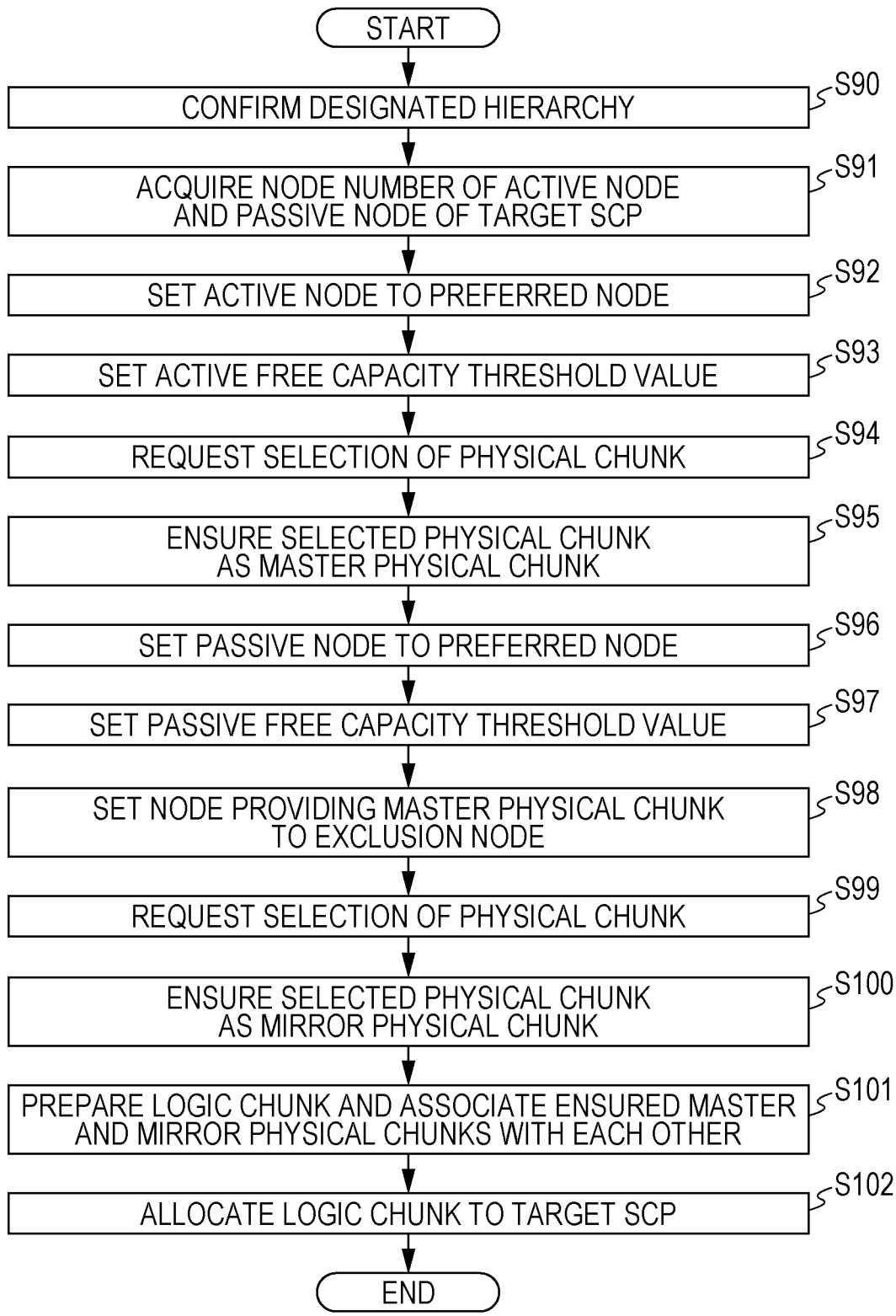
FIG. 28 is a flowchart illustrating a processing procedure of capacity allocation processing according to the third embodiment.

FIG. 28 illustrates a processing procedure of capacity allocation processing executed by the capacity allocation processing module 56 (FIG. 27) of the capacity control module 55 of this embodiment in which the allocation of the initial or the additional storage capacity with respect to the storage control module pair 25 to which the active storage control module 22 belongs, is requested from the active storage control module 22 in the same storage node 51. Furthermore, in the case of this embodiment, the active storage control module 22 designates the storage hierarchy, and requests the allocation of the storage capacity to the capacity control module 55.

In a case where such a request is applied, the capacity allocation processing module 56 starts the capacity allocation processing illustrated in FIG. 28, and first, confirms the designated storage hierarchy (S90), and after that, performs the processing of Step S91 to Step S93 as with the processing of Step S20 to Step S22 of the capacity allocation processing of the first embodiment described in FIG. 13.

Subsequently, the capacity allocation processing module 56 calls out the physical chunk selection processing module 57 (FIG. 27), and requests the selection of the physical chunk PC to be associated with the logic chunk LC of the storage hierarchy allocated to the target storage control module pair 25, which is confirmed in Step S90 (S94). Thus, the physical chunk selection processing module 57 receiving the request, preferentially selects the physical chunk PC to be allocated to the logic chunk LC of the designated storage hierarchy of the target storage control module pair 25 from the free physical chunks PC in the cluster 6, from the free physical chunks PC in the preferred node (here, the storage node 51 in which the active storage control modules 22 are arranged), and notifies the chunk number of the selected free physical chunk PC to the capacity allocation processing module 56.

Next, the capacity allocation processing module 56 performs the processing of Step S95 to Step S98 as with the processing of Step S24 to Step S27 of the capacity allocation processing of the first embodiment described in FIG. 13. After that, the capacity allocation processing module 56 calls out the physical chunk selection processing module 57 (FIG. 27), and request the selection of the physical chunk PC to be associated with the logic chunk LC of the storage hierarchy allocated to the target storage control module pair 25, which is confirmed in Step S90 (S99). Thus, the physical chunk selection processing module 57 receiving the request, and preferentially selects the physical chunk PC to be allocated to the logic chunk LC of the designated storage hierarchy of the target storage control module pair 25 from the free physical chunks PC in the cluster 6, from the free physical chunks PC in the preferred node (here, the storage node 51 in which the passive storage control modules 22 are arranged), and notifies the chunk number of the selected free physical chunk PC to the capacity allocation processing module 56.

Subsequently, the capacity allocation processing module 56 performs the processing of Step S100 to Step S102 as with the processing of Step S29 to Step S31 of the capacity allocation processing described in FIG. 13, and after that, ends the capacity allocation processing.

Figure 29:
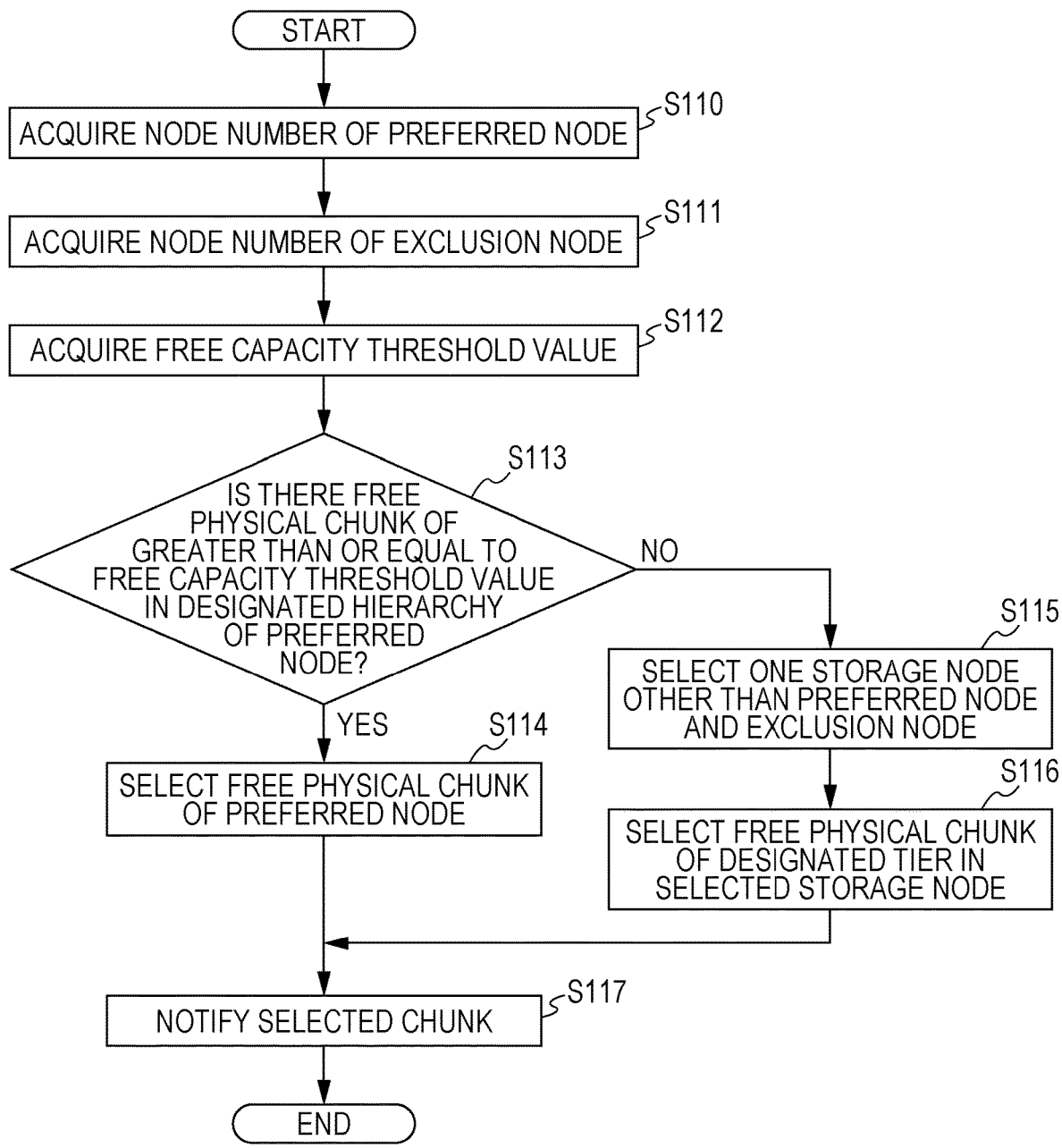
FIG. 29 is a flowchart illustrating a processing procedure of physical chunk selection processing according to the third embodiment.

On the other hand, FIG. 29 illustrates the processing contents of physical chunk selection processing executed by the physical chunk selection processing module 57 receiving the request such that the physical chunk PC associated with the logic chunk LC allocated to the target storage control module pair 25 is selected from the capacity allocation processing module 56 in Step S94 or Step S99 of the capacity allocation processing of this embodiment, described in FIG. 28.

In a case where such a request is applied from the capacity allocation processing module 56, the physical chunk selection processing module 57 starts the physical chunk selection processing illustrated in FIG. 29, and first, performs the processing of Step S110 to Step S112 as with the processing of Step S40 to Step S42 of the physical chunk selection processing of the first embodiment described in FIG. 14.

Subsequently, the physical chunk selection processing module 57 determines whether the preferred node is not the exclusion node, and there is the free physical chunk PC of which the total capacity is greater than or equal to the active free capacity threshold value (the case of the request of Step S93) or the passive free capacity threshold value (the case of the request of Step S99) in the storage device of the designated hierarchy in the preferred node (S113). Furthermore, the determination is performed with reference to the number of free physical chunks management table 54 (FIG. 26).

Then, in a case where a positive result is obtained in the determination, the physical chunk selection processing module 57 selects one free physical chunk PC from the free physical chunks PC provided by the storage device 13 of the designated storage hierarchy in the preferred node, with reference to the physical chunk management table 52 (FIG. 24) (S114), and notifies the chunk number of the selected free physical chunk PC to the capacity allocation processing module 56 (S117), and then, ends the physical chunk selection processing.

In contrast, in a case where a negative result is obtained in the determination of Step S113, the physical chunk selection processing module 57 selects one storage node 51 from the storage nodes 51 other than the preferred node and the exclusion node in the cluster 6 (S115). At this time, for example, a method of selecting the storage node 51 having the largest number of free physical chunks PC in the physical chunks PC provided by the storage device 13 of the designated storage hierarchy, with reference to the number of free physical chunks management table 37, can be applied as a selection method of the storage node 51. Here, the storage node 51 may be selected according to the other method.

Subsequently, the physical chunk selection processing module 57 selects one free physical chunk PC from the free physical chunks PC provided by the storage device 13 of the designated storage hierarchy in the selected storage node 51 in Step S115 (S116). In addition, the physical chunk selection processing module 57 notifies the chunk number of the selected free physical chunk PC to the capacity allocation processing module 56 (S117), and after that, ends the physical chunk selection processing.

As described above, according to this embodiment, the same effect as that of the first embodiment can be obtained in the information processing system 50 on which the hierarchical control function is mounted.

(4) Other Embodiments

Figure 30:
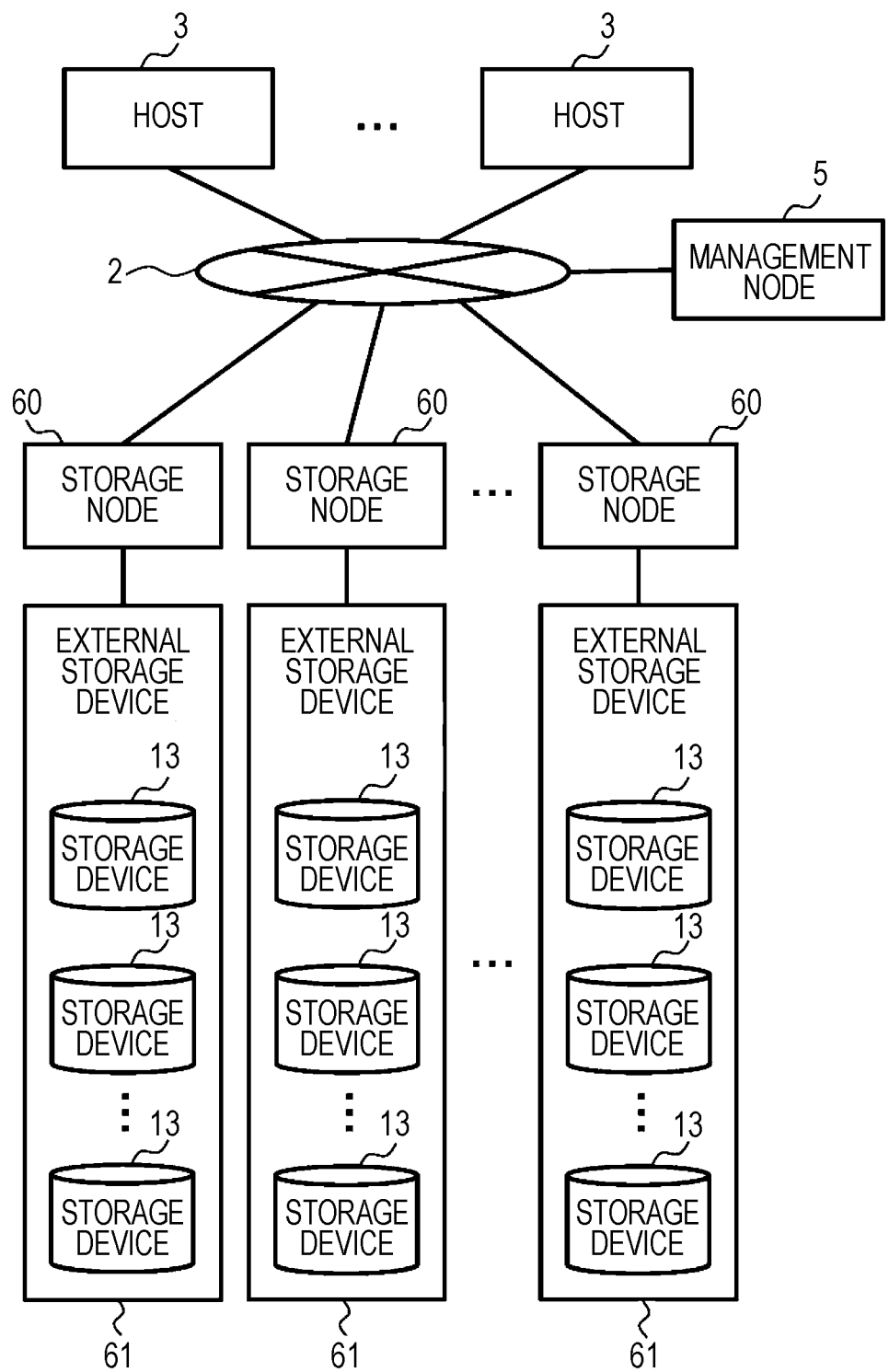
FIG. 30 is a block diagram illustrating an overall configuration of an information processing system according to the other embodiment.

Furthermore, in the first embodiment to the third embodiment described above, as illustrated in FIG. 1, FIG. 17, and FIG. 22, a case has been described in which the storage device 13 providing the physical storage area to the host device is mounted on each of the storage nodes 4, 41, and 51, but the invention is not limited thereto, and for example, as illustrated in FIG. 30 in which the same reference numerals are applied to the corresponding portions of FIG. 1, an external storage device 61 on which the storage device 13 is mounted, may be connected to a storage node 60 without mounting such a storage device 13 on each of the storage nodes 60.

In such a case, a hardware configuration of each of the storage nodes 60 may be a configuration in which the storage device 13 is removed from FIG. 2, and a logic configuration of each of the storage nodes 60 may be identical to the logic configuration of the storage node 4 configured as illustrated in FIG. 3. Furthermore, in such a case, the control contents of the frontend driver 20, the backend driver 21, the storage control module 22, and the capacity control module 23 are identical to those of the first embodiment.

Accordingly, in the case of this example, the physical chunk PC provided by the storage device 13 mounted on the external storage device 61 which is connected to the storage node 60 in which the active storage control modules 22 configuring the storage control module pair 25 are arranged, and the logic chunk LC associated with the physical chunk PC provided by the storage device 13 mounted on the external storage device 61 which is connected to the storage node 60 in which the passive storage control modules 22 configuring the storage control module pair 25 are arranged, are allocated to each of the storage control module pairs 25.

In addition, in the first embodiment to the third embodiment described above, in Steps S45 and S46 of the physical chunk selection processing described in FIG. 14, Steps S87 and S88 of the physical chunk selection processing described in FIG. 21, and Steps S115 and S116 of the physical chunk selection processing described in FIG. 29, a case has been described in which the physical chunk PC associated with the logic chunk LC allocated to the storage control module pair 25 is selected from the free physical chunks PC in the storage node 4 having the largest number of free physical chunks PC, but the invention is not limited thereto, and the active storage control module 22 configuring the storage control module pair 25 or the physical chunk PC in the vicinity of the arrangement destination of the passive storage control module 22 may be preferentially associated with the logic chunk LC allocated to the storage control module pair 25.

Furthermore, "the physical chunk PC in the vicinity of the arrangement destination of the storage control module 22" indicates the physical chunk PC in which the number of network devices such as a switch, through which the storage control module 22 passes at the time of accessing the physical chunk PC, is small. Accordingly, the physical chunk PC in the most vicinity of the arrangement destination of the storage control module 22 is the physical chunk PC in the storage node 4 where the storage control modules 22 are arranged.

Thus, even in a case where the active storage control module 22 configuring the storage control module pair 25 or the physical chunk PC in the vicinity of the arrangement destination of the passive storage control module 22 are preferentially associated with the logic chunk LC allocated to the storage control module pair 25, it is possible for the active storage control module 22 or the passive storage control module 22 to promptly access the physical chunk PC, and it is possible to promptly perform the reading/writing of the data with respect to the physical chunk PC.

Further, in the first embodiment described above, as described in FIG. 13 and FIG. 14, a case has been described in which the storage node 4 in which the active storage control modules 22 of the storage control module pair 25 are arranged, or the storage node 4 in which the passive storage control modules 22 of the storage control module pair 25 are arranged, are set to the preferred node (refer to Step S21 and Step S25 of FIG. 13), and thus, the physical chunk selection processing module 31 selects the free physical chunk PC of the storage node 4 as the physical chunk PC which is preferentially associated with the logic chunk LC allocated to the storage control module pair 25, but the invention is not limited thereto, and the physical chunk selection processing module 31 may select the free physical chunk PC associated with the logic chunk LC on the basis of only the number of free physical chunks PC of each of the storage nodes 4 in the cluster 6.

Figure 31:
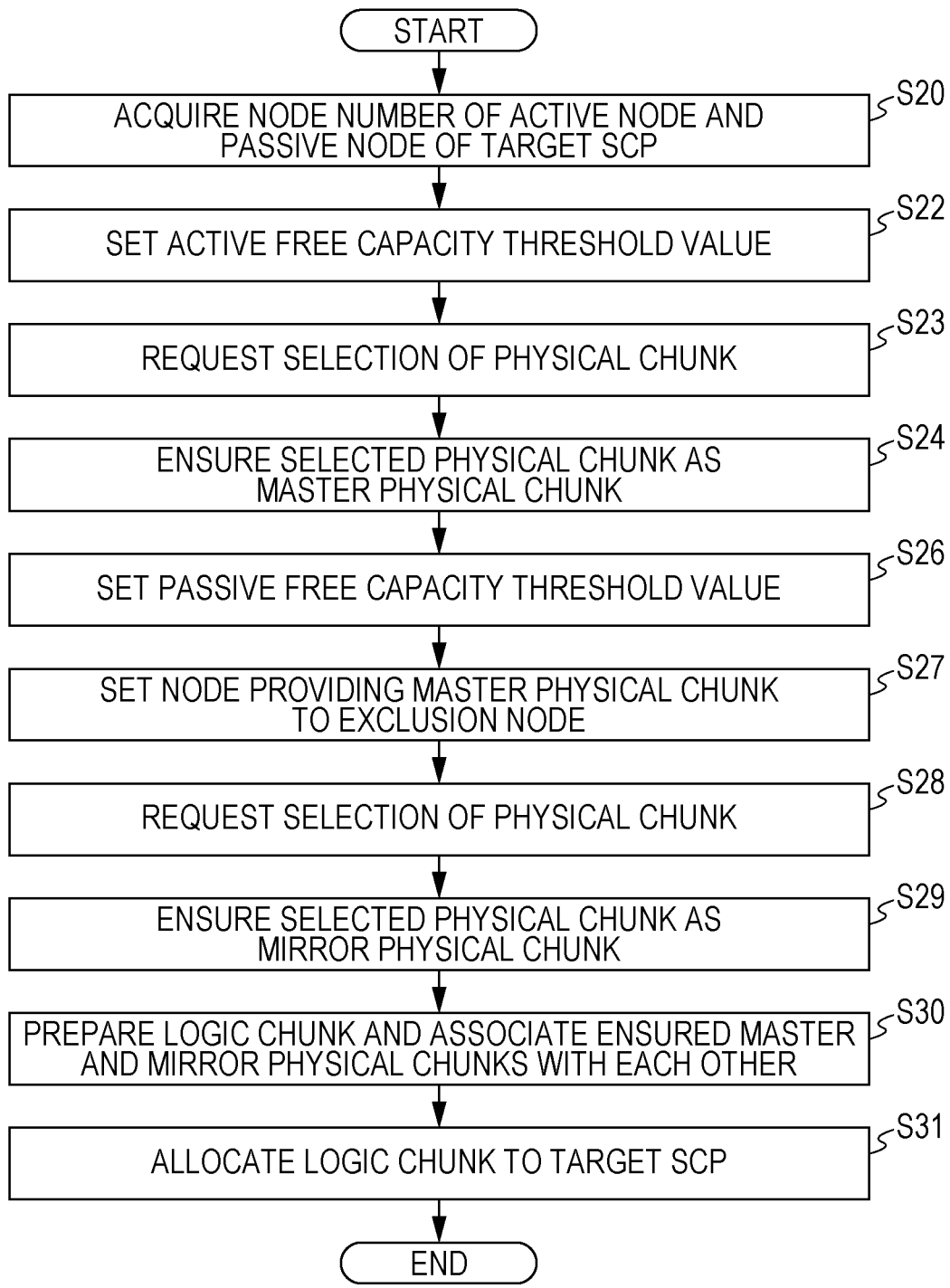
FIG. 31 is a flowchart illustrating a processing procedure of capacity allocation processing according to the other embodiment.
Figure 32:
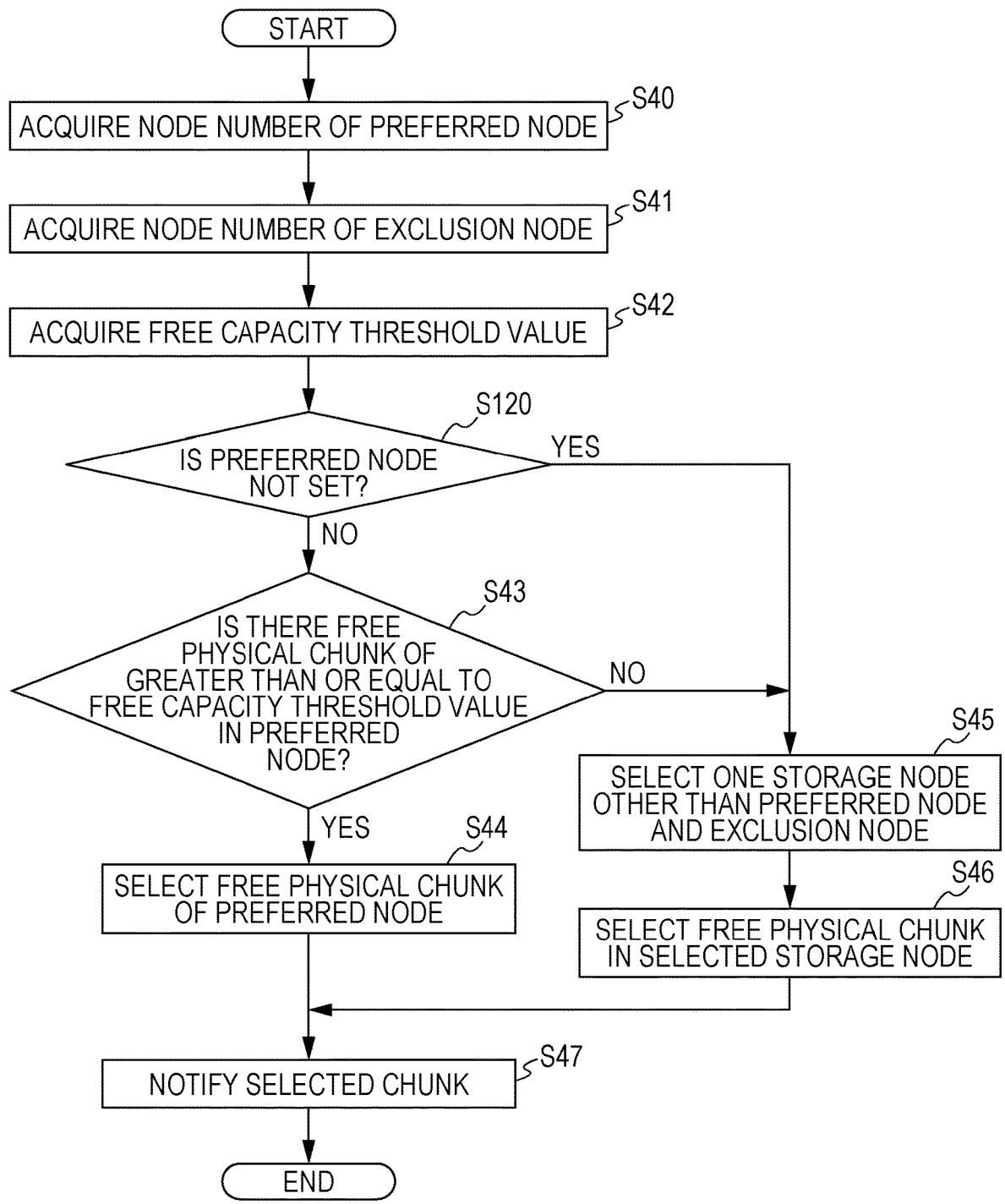
FIG. 32 is a flowchart illustrating a processing procedure of physical chunk selection processing according to the other embodiment.

Specifically, as illustrated in FIG. 31 in which the same reference numerals are applied to the corresponding portions of FIG. 13, the capacity allocation processing module 30 does not set the storage node 4 in which the active storage control modules 22 or the passive storage control modules 22 of the target storage control module pair 25 are arranged, to the preferred node by omitting Step S21 and Step S25 of FIG. 13. In addition, as illustrated in FIG. 32 in which the same reference numerals are applied to the corresponding portions of FIG. 14, the physical chunk selection processing module 31 may determine whether or not the preferred node is set after Step S42 (S120), and in a case where a negative result is obtained, may proceed to Step S43, and in a case where a positive result is obtained, may proceed to Step S45.

Figure 33:
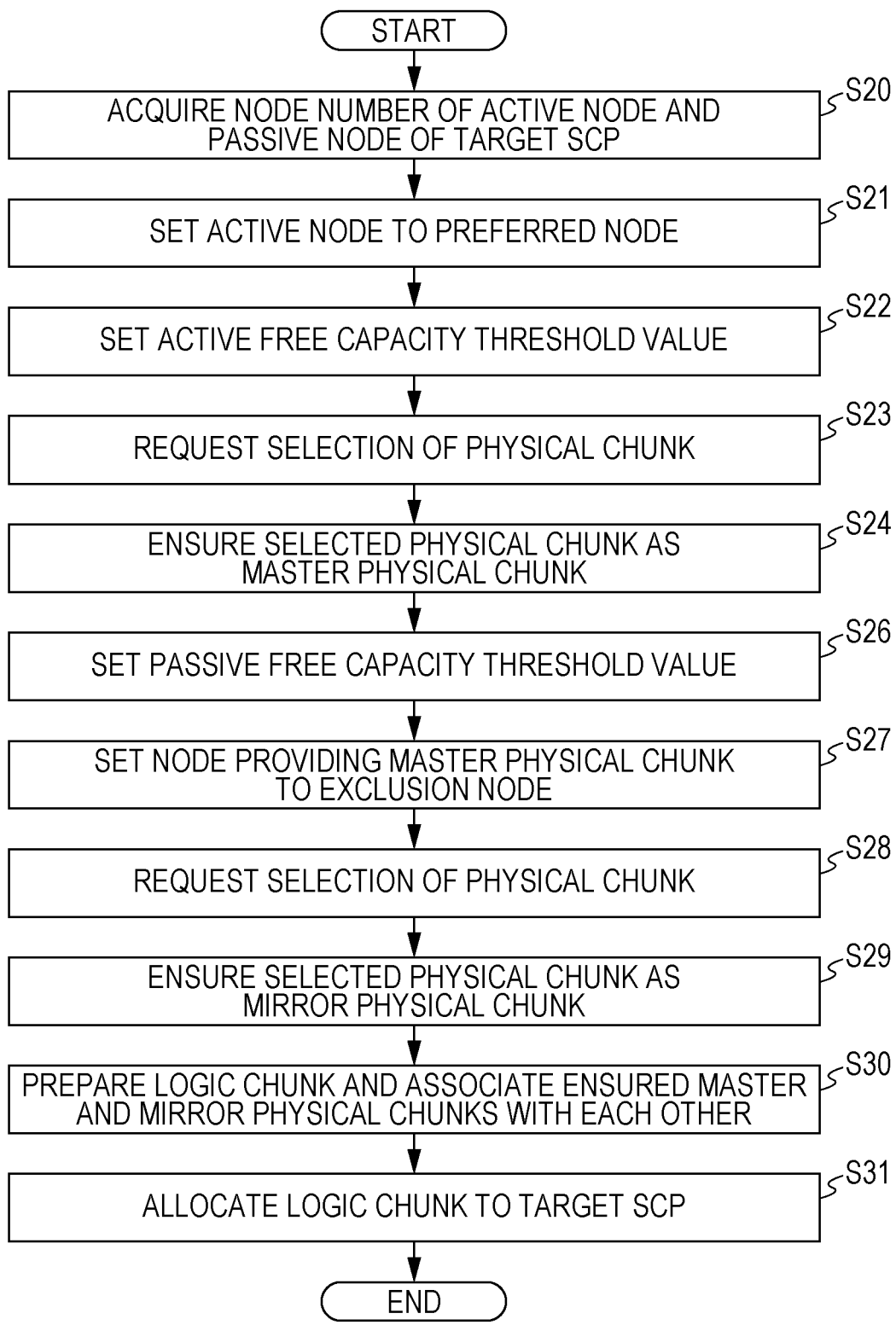
FIG. 33 is a flowchart illustrating a processing procedure of capacity allocation processing according to the other embodiment.

Here, it is preferable to select the free physical chunk PC in the storage node 4 where the active storage control modules 22 of the storage control module pair 25 are arranged as the physical chunk PC associated with the logic chunk LC allocated to the storage control module pair 25 since the response performance of the entire system in normal time is excellent, and thus, as illustrated in FIG. 33 in which the same reference numerals are applied to the corresponding portions of FIG. 13, the capacity allocation processing module 30 may be configured such that Step S21 is executed, and Step S25 of FIG. 13 is omitted. In such a case, the physical chunk selection processing module 31 may be structured such that processing of a flowchart of FIG. 32 is executed.

Further, in the third embodiment described above, as described in FIG. 28 and FIG. 29, a case has been described in which the capacity allocation processing module 56 (FIG. 27) of the capacity control module 55 (FIG. 27) sets the storage node 4 in which the active storage control modules 22 of the storage control module pair 25 are arranged, or the storage node 4 in which the passive storage control modules 22 of the storage control module pair 25 are arranged, to the preferred node, with respect to all of the hierarchies (refer to Step S21 and Step S25 of FIG. 13), and thus, the physical chunk selection processing module 57 (FIG. 27) selects the free physical chunk PC of the storage node 4 as the physical chunk PC which is preferentially associated with the logic chunk LC allocated to the storage control module pair 25, but the invention is not limited thereto, and only when the designated storage hierarchy is a highest-level storage hierarchy, the physical chunk selection processing module 57 may select the free physical chunk PC associated with the logic chunk LC on the basis of only the number of free physical chunks PC of each of the storage nodes 4 in the cluster 6.

Figure 34:
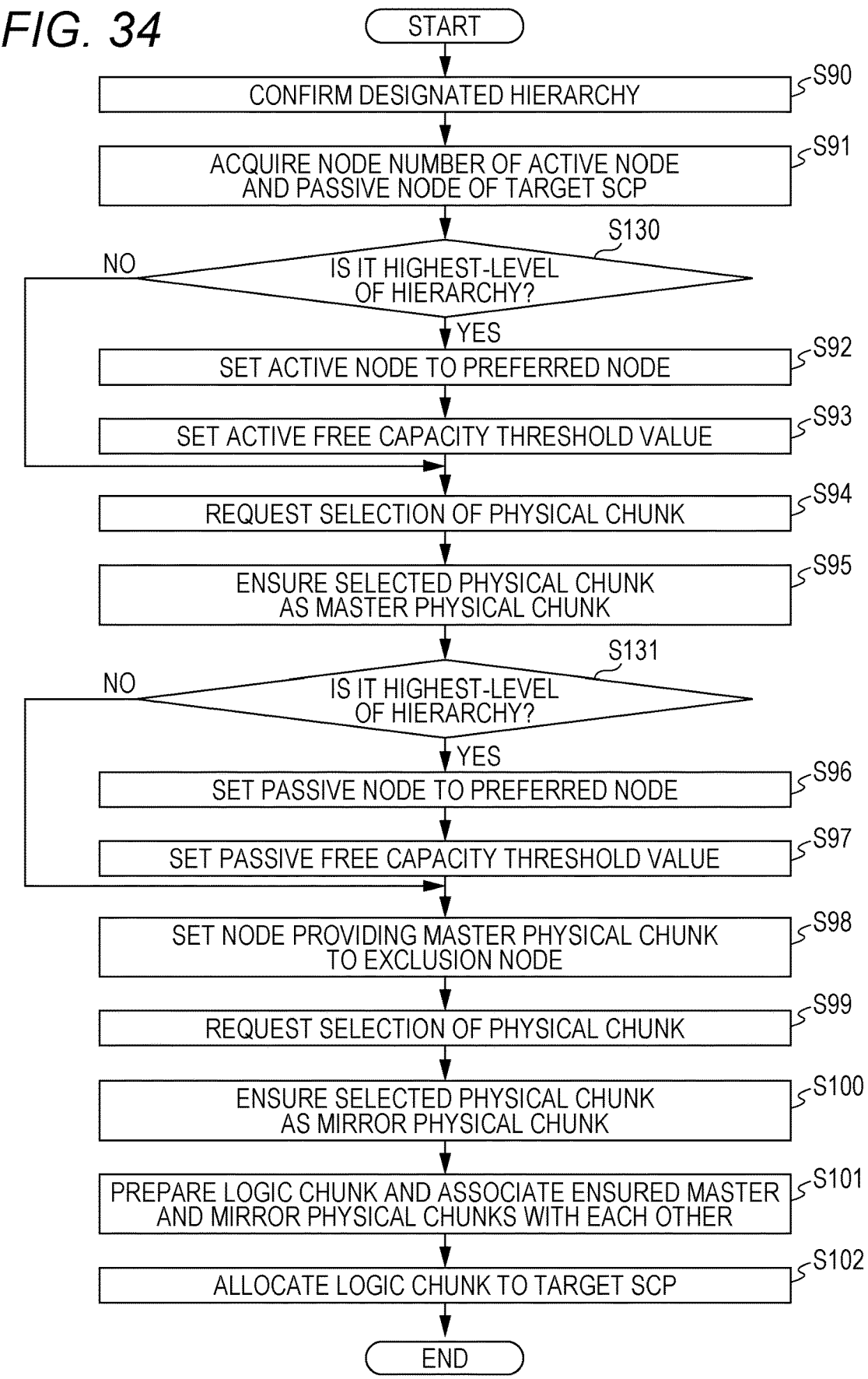
FIG. 34 is a flowchart illustrating a processing procedure of capacity allocation processing according to the other embodiment.

In such a case, as illustrated in FIG. 34 in which the same reference numerals are applied to the corresponding portions of FIG. 28, the capacity allocation processing module 56 determines whether the storage hierarchy confirmed in Step S90 after the processing of Step S91 is executed, is the highest-level storage hierarchy (S130), and in a case where a negative result is obtained, proceeds to Step S93 without setting the storage node 4 in which the active storage control modules 22 of the target storage control module pair 25 are arranged, to the preferred node. In addition, the capacity allocation processing module 56 determines whether or not the storage hierarchy confirmed in Step S90 after the processing of Step S95 is executed, is the highest-level storage hierarchy (S131), and in a case where a negative result is obtained, proceeds to Step S97 without setting the storage node 4 in which the active storage control modules 22 of the target storage control module pair 25 are arranged, to the preferred node.

Figure 35:
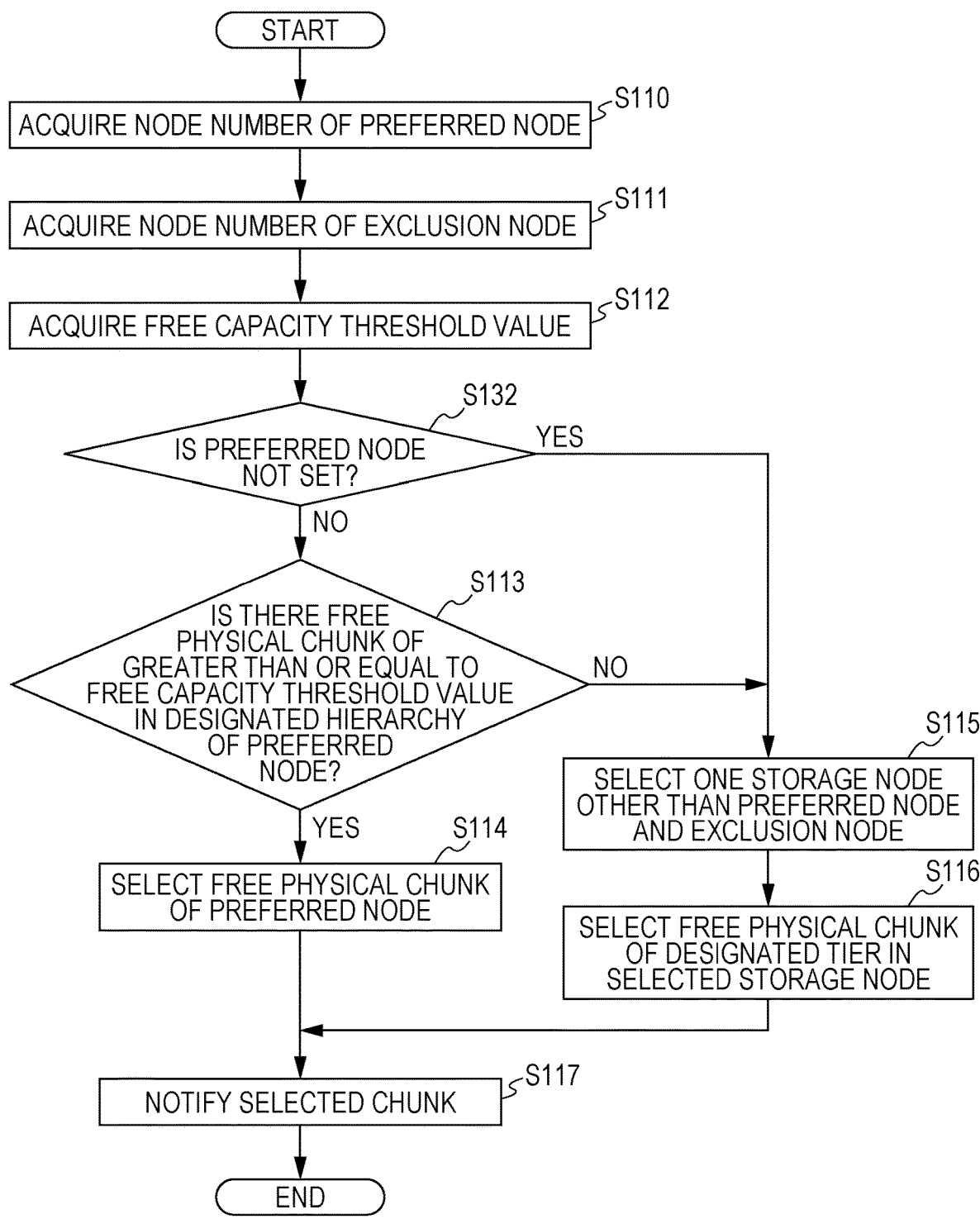
FIG. 35 is a flowchart illustrating a processing procedure of physical chunk selection processing according to the other embodiment.

In addition, in such a case, as illustrated in FIG. 35 in which the same reference numerals are applied to the corresponding portions of FIG. 29, the physical chunk selection processing module 31 determines whether or not the preferred node is set after Step S112 (S132), in a case where a negative result is obtained, may proceed to Step S115, and in a case where a positive result is obtained, may proceed to Step S114.

Thus, the storage area can be allocated to the highest-level storage hierarchy in which the response performance is requested, from the own node, and the storage area can be equally allocated to the other storage hierarchies from each of the storage nodes 4.

In addition, a hypervisor may be operated on the server, one or a plurality of virtual machines may be activated on the hypervisor, and various software illustrated in FIG. 3 may be operated on the virtual machine. That is, various software (the frontend driver 20 and the backend driver 21, the storage control module 22, and the capacity control module 23) may be operated on the virtual machine insofar as being operated on hardware of a physical calculator. Similarly, a compute node 2 may be an application program (a host program) which is operated on the virtual machine, or may be a physical host calculator (a host computer). When the information processing system 1 includes a plurality of servers, a part of the server may be in a different site. In addition, a part or the entire of the server of the information processing system 1 may be on the ground, and the service may be provided to the user through the network.

The virtual machine operated by various software (the frontend driver 20 and the backend driver 21, the storage control module 22, and the capacity control module 23) and the virtual machine operated by the host program may have a configuration on the same server (node) (a hyper converged infrastructure), or may have a configuration on different servers which are connected to each other through the network.

The invention can be applied to an information processing system including a plurality of storage nodes in which one or a plurality of SDSs are implemented.

What is claimed is:
1. A storage system including a plurality of storage nodes, each of the storage nodes comprising:
a respective storage device;
a respective capacity control unit which manages a capacity provided by each of the storage devices of the plurality of storage nodes in a cluster; and
a respective plurality of storage control units;
wherein in the storage system:
the respective plurality of storage control units in the plurality of storage nodes are organized into a plurality of storage control unit groups, wherein each storage control unit group comprises a respective active storage control unit on a respective first storage node of the plurality of storage nodes, and one or more respective passive storage control units, wherein a respective one of the passive storage control units is on a respective second storage node of the plurality of storage nodes;
wherein each respective storage control unit group store data redundantly by forming a plurality of pieces of data, which are stored in respective storage devices of different storage nodes, into a set;
wherein for each respective storage control unit group:
the respective active storage control unit receives I/O requests, generates commands according to received I/O requests, and transmits commands to the respective capacity control unit of the respective first storage node;
the one or more respective passive storage control units are inactive while the respective active storage control unit remains operational, wherein if the respective active storage unit fails, the respective passive storage control unit corresponding to the respective second storage node takes over as a respective new active storage control unit for the respective storage control unit group;

the respective capacity control unit of the respective first storage node allocates physical storage areas from the respective storage devices of the plurality of storage nodes;

wherein at least two storage nodes of the plurality of storage nodes each comprise at least one active storage control unit of a respective one of the plurality of storage control unit groups, and at least one passive storage control unit of a different respective one of the plurality of storage control unit groups.

2. The storage system according to claim 1,
wherein for each respective storage control unit group, the respective capacity control unit of the respective first storage node prioritizes allocating physical storage areas from the respective storage devices of the respective first storage node and the respective second storage node over the respective storage devices of other nodes of the plurality of nodes.

3. The storage system according to claim 1,
wherein for each respective storage control unit group, when the respective active storage unit fails, and the respective passive storage control unit corresponding to the respective second storage node takes over as a respective new active storage control unit for the respective storage control unit group, a respective new passive storage control unit is added to the respective storage control unit group, wherein the new respective passive storage control unit is on a respective replacement storage node other than the respective first storage node and the respective second storage node;
wherein the respective capacity control unit of the respective second storage node allocates physical storage areas from the respective storage device of the respective replacement storage node to the respective storage control unit group.

4. The storage system according to claim 3,
wherein before the respective active storage unit fails, master data is the respective storage device of the respective first storage node and mirror data is stored in the respective storage device of the respective second storage node; and
wherein after the respective active storage unit fails, the mirror data is switched to new master data and new mirror data is stored in the respective storage device of the respective replacement storage node.

5. The storage system according to claim 2,
wherein for each respective storage control unit group, the respective capacity control unit of the respective first storage node further prioritizes allocating physical storage areas from the respective storage device of the respective first storage node over the respective storage device of the respective second storage node.

6. The storage system according to claim 2,
wherein for each of the plurality of storage control unit groups, the respective first storage nodes and the respective second storage node each have a respective threshold value, and wherein when a free capacity of a respective physical storage areas of one of the respective first storage node and the respective second storage node becomes smaller than the respective free capacity threshold value of that storage node, the respective capacity control unit of the respective first storage node stops prioritizing allocating physical storage areas from the respective storage devices of that storage node.

7. The storage system according to claim 6,
wherein the respective threshold value for the respective first storage node is less than the respective threshold value for the respective second storage node.

8. The storage system according to claim 1,
wherein the storing data redundantly is performed by storing the same data in more than one of the plurality of storage nodes.

9. The storage system according to claim 1,
wherein the storing data redundantly is performed by generating a redundant code from the data and storing the redundant code in a storage node of the plurality of storage nodes different from a storage node of the plurality of storage nodes in which the data is to be stored.

10. A method of operating a storage system including a plurality of storage nodes, each of the storage nodes including: a respective storage device; a respective capacity control unit which manages a capacity provided by each of the storage devices of the plurality of storage nodes in a cluster; and a respective plurality of storage control units, the method comprising:
the storage system organizing the plurality of storage control units in the plurality of storage nodes into a plurality of storage control unit groups, wherein each storage control unit group comprises a respective active storage control unit on a respective first storage node of the plurality of storage nodes, one or more respective passive storage control units, wherein a respective one of the passive storage control units is on a respective second storage node of the plurality of storage nodes;
each respective storage control unit group performing the steps of:
storing data redundantly in each respective storage control unit group by forming a plurality of pieces of data, which are stored in respective storage devices of different storage nodes, into a set;
the respective active storage control unit receiving I/O requests, generating commands according to received I/O requests, and transmitting commands to the respective capacity control unit of the respective first storage node;
the one or more respective passive storage control units being inactive while the respective active storage control unit remains operational, wherein if the respective active storage unit fails, the respective passive storage control unit corresponding to the respective second storage node taking over as a respective new active storage control unit for the respective storage control unit group;
the respective capacity control unit of the respective first storage node allocating physical storage areas from the respective storage devices of the plurality of storage nodes;
at least two storage nodes of the plurality of storage nodes each comprising at least one active storage control unit of a respective one of the plurality of storage control unit groups, and at least one passive storage control unit of a different respective one of the plurality of storage control unit groups.

* * * * *